(12) United States Patent
Rotter

(10) Patent No.: US 11,536,232 B2
(45) Date of Patent: Dec. 27, 2022

(54) ENGINE AIR CLEANER

(71) Applicant: Kohler Co., Kohler, WI (US)

(72) Inventor: Terrence Rotter, Sheboygan Falls, WI (US)

(73) Assignee: KOHLER CO.

( * ) Notice: Subject to any disclaimer, the term of this patent is extended or adjusted under 35 U.S.C. 154(b) by 49 days.

(21) Appl. No.: 16/925,249

(22) Filed: Jul. 9, 2020

(65) Prior Publication Data

US 2020/0340432 A1 Oct. 29, 2020

Related U.S. Application Data

(63) Continuation of application No. 15/918,824, filed on Mar. 12, 2018, now Pat. No. 10,746,141.

(Continued)

(51) Int. Cl.
*B01D 50/00* (2022.01)
*F02M 35/08* (2006.01)
(Continued)

(52) U.S. Cl.
CPC ............ *F02M 35/08* (2013.01); *B01D 45/12* (2013.01); *B01D 45/16* (2013.01);
(Continued)

(58) Field of Classification Search
CPC ............... F02M 35/08; F02M 35/0204; F02M 35/0205; F02M 35/0223; F02M 35/02416;
(Continued)

(56) References Cited

U.S. PATENT DOCUMENTS 3,078,650 A 2/1963 Anderson
3,165,390 A 1/1965 Parken
(Continued)

FOREIGN PATENT DOCUMENTS

CN 201184252 1/2009
EP 0541857 7/1995
(Continued)

OTHER PUBLICATIONS

Cat Turbine PreCleaner, Caterpillar; PEHP7077-05; 2014; 4 pages.
(Continued)

*Primary Examiner* — Dung H Bui
(74) *Attorney, Agent, or Firm* — The Belles Group, P.C.

(57) ABSTRACT

An apparatus for removing debris from the intake of an engine includes an air cleaner housing with an inlet opening, an air entry cavity, one or more turbulent flow tubes, and at least one outlet opening. The inlet opening in the air cleaner housing is configured to receive an incoming flow of air from a blower. The air entry cavity is coupled with the inlet opening of the air cleaner housing. The one or more turbulent flow tubes configured to divide the flow of air from the air entry cavity and remove debris from the flow of air. The at least one outlet opening in the air cleaner housing is coupled to the one or more turbulent flow tubes and configured to expel the debris from the air cleaner housing. In addition, excess air from the air cleaner housing and/or combustion air is expelled from the air cleaner housing.

16 Claims, 20 Drawing Sheets

Related U.S. Application Data

(60) Provisional application No. 62/471,145, filed on Mar. 14, 2017.

(51) Int. Cl.

| | | |
|---|---|---|
| *F02M 35/022* | (2006.01) | |
| *F02M 35/02* | (2006.01) | |
| *F02M 35/024* | (2006.01) | |
| *F02M 35/06* | (2006.01) | |
| *B01D 45/16* | (2006.01) | |
| *B01D 45/12* | (2006.01) | |
| *B04C 3/04* | (2006.01) | |
| *B01D 50/20* | (2022.01) | |

(52) U.S. Cl.
CPC .... *F02M 35/0204* (2013.01); *F02M 35/0205* (2013.01); *F02M 35/0223* (2013.01); *F02M 35/02416* (2013.01); *F02M 35/06* (2013.01); *B01D 50/20* (2022.01); *B04C 3/04* (2013.01); *F02M 35/0216* (2013.01)

(58) Field of Classification Search
CPC .... F02M 35/06; F02M 35/0216; B01D 45/12; B01D 45/16; B01D 50/20; B04C 3/04
See application file for complete search history.

(56) References Cited

U.S. PATENT DOCUMENTS

| | | | |
|---|---|---|---|
| 3,173,775 A | 3/1965 | Hampton | |
| 3,429,108 A | 2/1969 | Larson | |
| 3,568,414 A | 3/1971 | Spriggs | |
| 3,713,280 A | 1/1973 | Keller | |
| 3,884,658 A | 5/1975 | Roach | |
| 3,915,679 A | 10/1975 | Roach | |
| 3,957,639 A | 5/1976 | Schoen | |
| 4,050,913 A | 9/1977 | Roach | |
| 4,197,102 A | 4/1980 | Decker | |
| 4,218,223 A | 8/1980 | Lidstone | |
| 4,242,115 A | 12/1980 | Harold | |
| 4,350,509 A | 9/1982 | Alseth | |
| 4,407,663 A | 10/1983 | Hawley | |
| 4,514,193 A | 4/1985 | Booth | |
| 4,537,608 A | 8/1985 | Koslow | |
| 4,588,423 A | 5/1986 | Gillingham | |
| 4,746,340 A | 5/1988 | Durre | |
| 5,108,608 A | 4/1992 | Carroll | |
| 5,320,654 A | 6/1994 | Minami | |
| 5,403,367 A | 4/1995 | De | |
| 5,472,463 A | 12/1995 | Herman | |
| 5,545,241 A | 8/1996 | Vanderauwera | |
| 6,067,943 A | 5/2000 | Morin | |
| 6,190,543 B1 | 2/2001 | Christiansen | |
| 6,379,411 B1 | 4/2002 | Turner | |
| 7,004,986 B2 * | 2/2006 | Kopec | B01D 46/0004 55/357 |
| 7,008,467 B2 * | 3/2006 | Krisko | B01D 27/06 95/271 |
| 8,177,872 B2 | 5/2012 | Nelson | |
| 9,228,545 B2 | 1/2016 | Rosenfeld | |
| 9,675,920 B2 | 6/2017 | Finn | |
| 9,745,924 B2 | 8/2017 | Navaliger | |
| 9,856,834 B2 | 1/2018 | Rosenfeld | |
| 10,359,011 B2 | 7/2019 | Dewit | |
| 2002/0189212 A1 | 12/2002 | Hettmann | |
| 2003/0057151 A1 | 3/2003 | Kopec | |
| 2003/0115842 A1 | 6/2003 | Inoue | |
| 2003/0182910 A1 | 10/2003 | Pikesh | |
| 2003/0217534 A1 | 11/2003 | Krisko | |
| 2004/0040271 A1 | 3/2004 | Kopec | |
| 2004/0216611 A1 | 11/2004 | Moredock | |
| 2005/0016138 A1 | 1/2005 | Sheidler | |
| 2005/0028499 A1 | 2/2005 | Greif | |
| 2005/0178137 A1 | 8/2005 | Hofle | |
| 2005/0262818 A1 | 12/2005 | Stenersen | |
| 2008/0016832 A1 | 1/2008 | Krisko | |
| 2008/0086989 A1 | 4/2008 | Sheidler | |
| 2008/0209869 A1 | 9/2008 | Rother | |
| 2010/0102150 A1 | 4/2010 | Maeda | |
| 2010/0154368 A1 | 6/2010 | Kopec | |
| 2010/0180768 A1 | 7/2010 | Folkvang | |
| 2011/0000458 A1 | 1/2011 | Muenkel | |
| 2011/0016917 A1 | 1/2011 | Prast | |
| 2012/0017638 A1 | 1/2012 | Prast | |
| 2013/0056407 A1 | 3/2013 | Parikh | |
| 2013/0340622 A1 | 12/2013 | Marty | |
| 2014/0260335 A1 | 9/2014 | Beeler | |
| 2015/0013292 A1 | 1/2015 | Coulonvaux | |
| 2015/0176544 A1 | 6/2015 | Kaufmann | |
| 2015/0275831 A1 | 10/2015 | Chlystek | |
| 2016/0030875 A1 | 2/2016 | Parikh | |
| 2016/0138507 A1 | 5/2016 | Klassen | |
| 2016/0305375 A1 | 10/2016 | Finn | |
| 2020/0318585 A1 * | 10/2020 | Herman | F02M 35/0223 |

FOREIGN PATENT DOCUMENTS

| | | |
|---|---|---|
| GB | 2433220 | 6/2007 |
| JP | 3889777 | 3/2007 |

OTHER PUBLICATIONS

Maintenance-Free Air Filtration, Donaldson Inertial Particle Separation Technology; Donaldson Company, Inc.; Brochure No. F111219 ENG (9/14); 4 pages.

Strata Cap Pre-cleaner, Donaldson Company, Inc.; Brochure No. F111297; 2011; 4 pages.

The Donaldson TopSpin Pre-Cleaner, Donaldson Company, Inc.; Brochure No. F111107; Sep. 2008; 4 pages.

XLR Powered Precleaner, SYKLITXLR Broch 01; Sy-Klone International, 2016; 2 pages.

* cited by examiner

100

ENGINE AIR CLEANER

CROSS REFERENCE TO PRIOR APPLICATIONS

This application is a continuation under 35 U.S.C. § 120 and 37 C.F.R. § 1.53(b) of U.S. patent application Ser. No. 15/918,824 filed Mar. 12, 2018, which claims the benefit of U.S. Provisional Application Ser. No. 62/471,145 filed Mar. 14, 2017, and each of which is hereby incorporated by reference in its entirety.

TECHNICAL FIELD

This disclosure relates in general to an engine air cleaner for the intake of an internal combustion engine, and more specifically an engine air cleaner including multiple tubes for dividing the flow of air for the intake of the internal combustion engine from debris.

BACKGROUND

An internal combustion engine includes one or more cylinders that receive a flow through an intake manifold. The flow may be a mixture of air and fuel or only air. The intake manifold may include a carburetor and/or an air filter. In some environments, debris may enter the intake manifold. Debris may include dirt particles, or grass, for example. The intake manifold may be connected to a cleaner or separator for removing the debris from the flow of air.

BRIEF DESCRIPTION OF THE DRAWINGS

Exemplary implementations are described herein with reference to the following drawings.

DETAILED DESCRIPTION

Figure 1A:
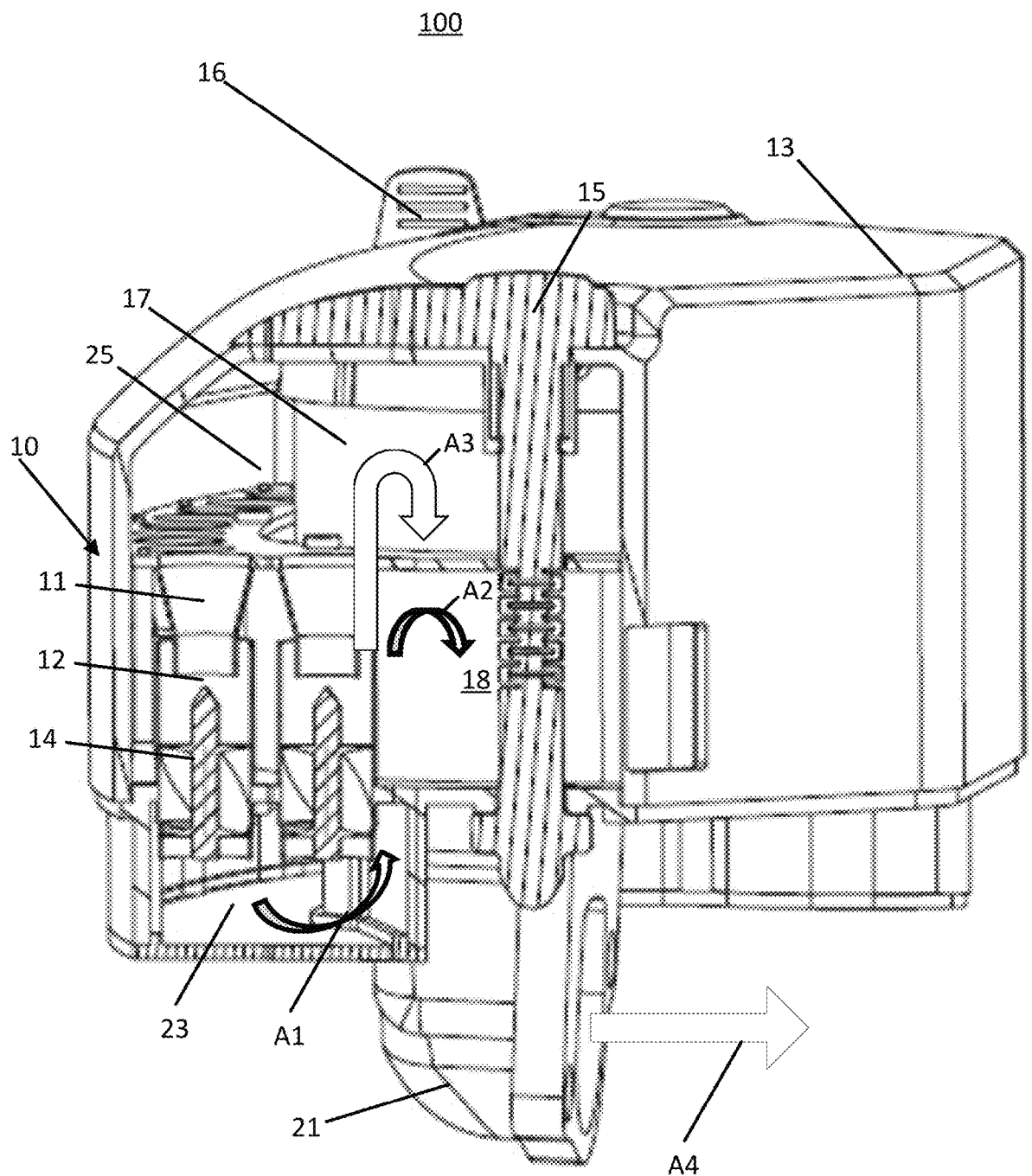
FIG. 1A illustrates an example three-dimensional view of an air cleaner for an engine.
Figure 1B:
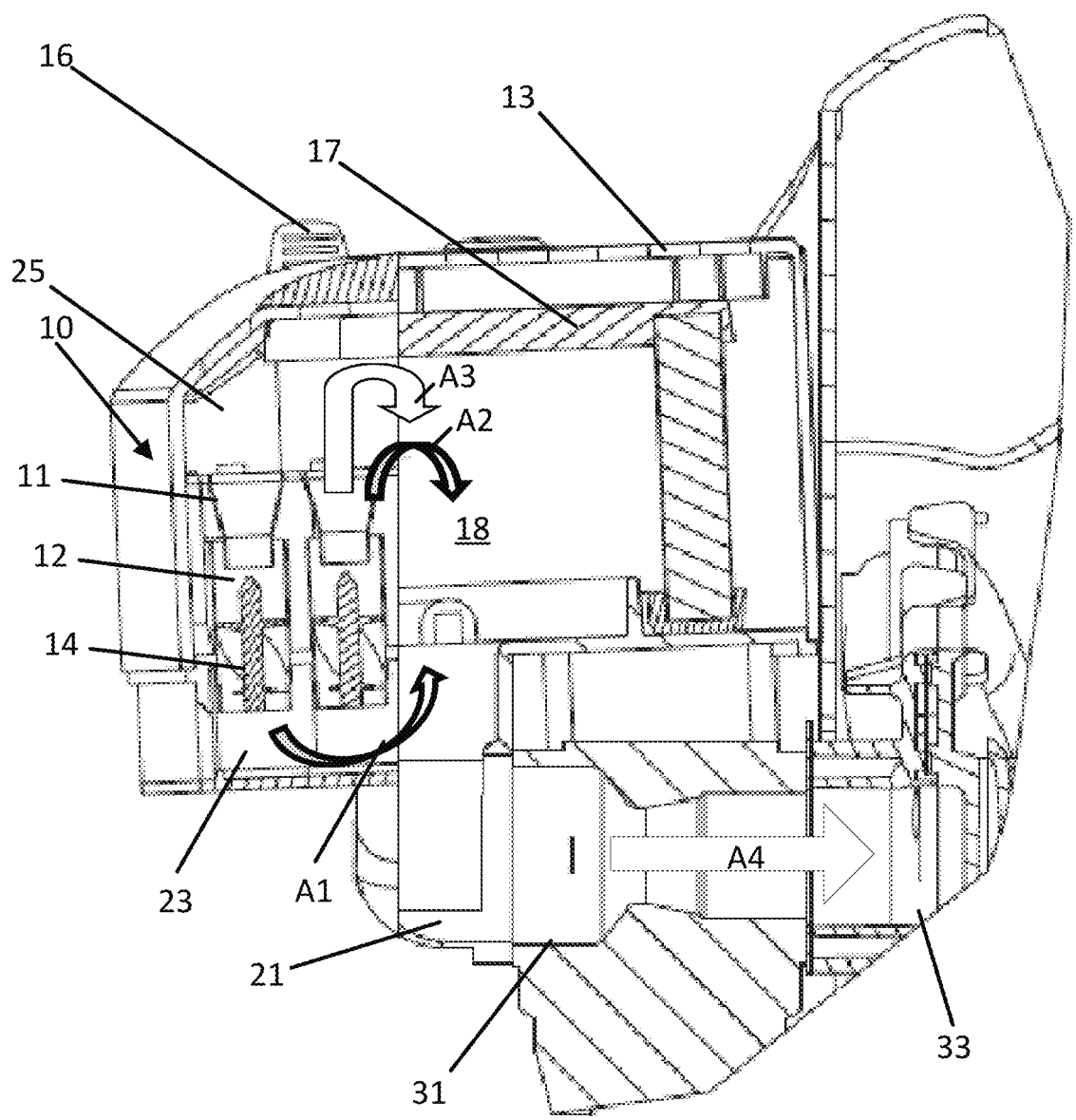
FIG. 1B illustrates an example two dimensional view of the air cleaner.
Figure 1C:
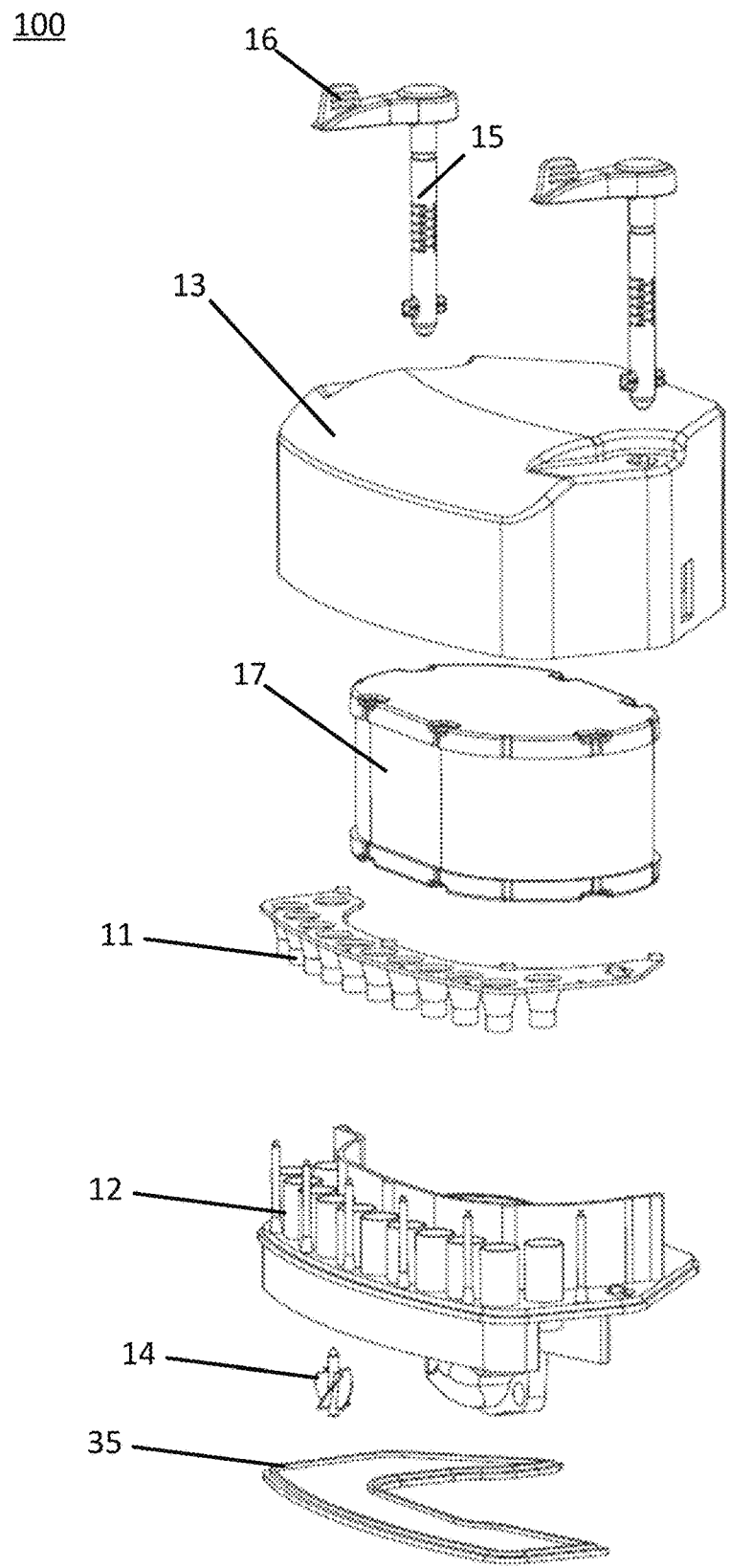
FIG. 1C illustrates an exploded front view of the components of the air cleaner.
Figure 1D:
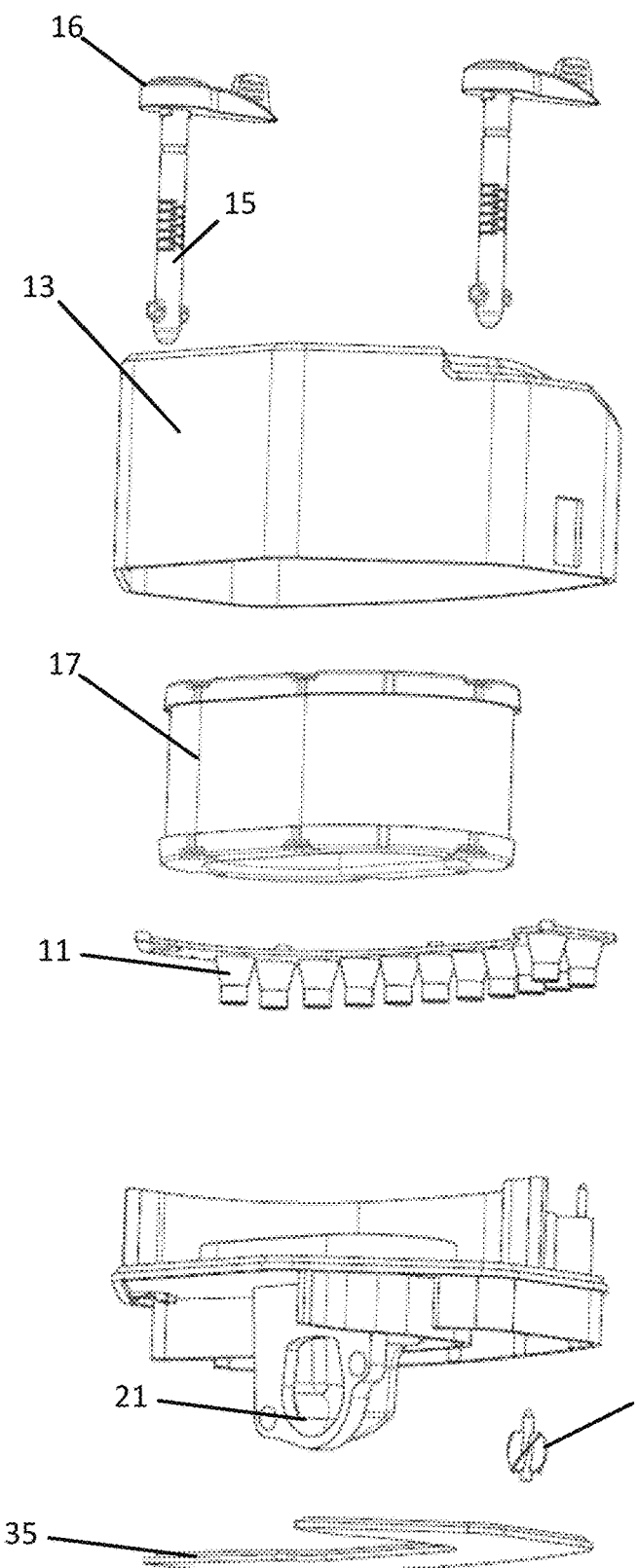
FIG. 1D illustrates an exploded rear view of the components of the air cleaner.
Figure 1E:
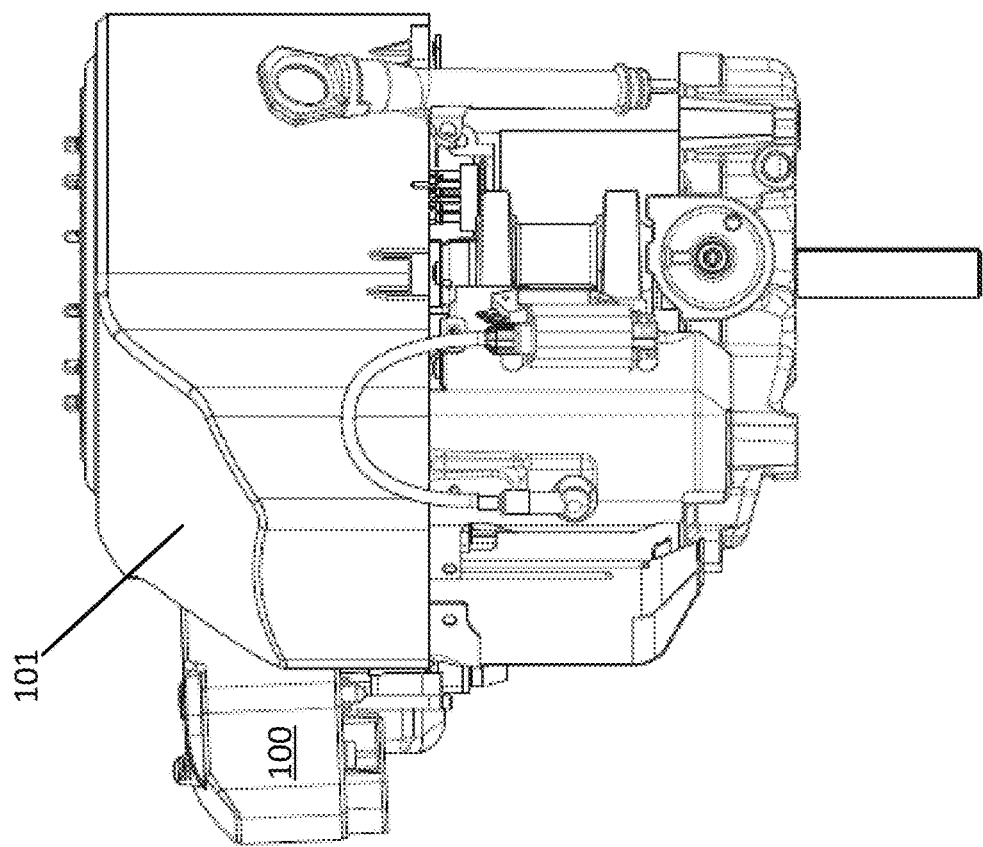
FIG. 1E illustrates an engine including the air cleaner of FIGS. 1A-1D.
Figure 1E:
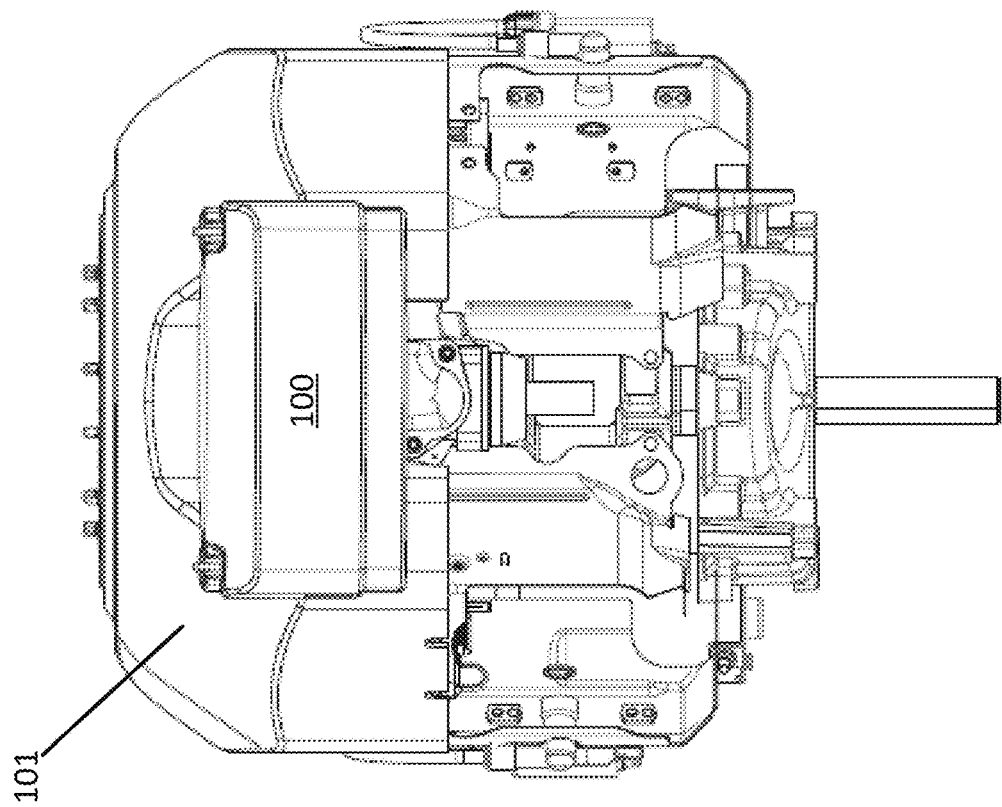

FIGS. 1A-1D illustrate an example air cleaner 100 for removing debris from the intake of an engine. FIG. 1A illustrates a three dimensional view of the air cleaner 100, FIG. 1B illustrates a two dimensional view of the air cleaner 100, FIG. 1C illustrates an exploded front view of the components of the air cleaner 100, and FIG. 1D illustrates an exploded rear view of the components of the air cleaner 100. FIG. 1E illustrates an engine 101 including the air cleaner 101 of FIGS. 1A-1D.

The air cleaner 100 includes a housing 13, an air filter fastener 15, a mounting grip 16, an air filter 17, a flow tube 10, and an air cleaner 100 outlet 21 for the engine intake or a combustion air manifold that is indirectly coupled with the set of flow tubes 10. The air cleaner 100 may also include additional outlets such as but not limited to a debris outlet and an air outlet. The flow tube 10 may include an inner tube 11, an outer tube 12, and a static actuator or air vane 14. The air cleaner 100 may also include multiple cavities including an output air cavity 25, a dirt ejection cavity 18, an air ejection cavity (not illustrated in FIG. 1), and an air injection cavity 23. Additional, different, or fewer components may be included.

The air cleaner housing 13 surrounds the components of the air cleaner 100 and secures the air cleaner 100 to the engine. In one example, an air cleaner base 35 (illustrated in FIGS. 1C and 1D) is coupled to the carburetor, throttle body, or intake manifold. The air cleaner housing 13 and optionally flow tubes 10 and filter 17 are amounted to the air cleaner base 35.

FIG. 1B further illustrates the connection of the air cleaner 100 to the engine. The air cleaner outlet 21 is coupled to carburetor 31 that combines air from the air cleaner 100 with fuel from a fuel line connected to a fuel tank. In addition, or in the alternative, the air cleaner outlet 21 may be coupled to a throttle body of the engine. The air and fuel mixture is provided to the engine through intake manifold 33. In some examples, the connection of the air cleaner 100 to the engine may depend on the type of engine. For example, in a spark ignition (SI) engine, the air cleaner base 35 is coupled to the carburetor 31 or throttle body, and in a compression engine (CI), the air cleaner base 35 is coupled to the intake manifold 33.

The air cleaner housing 13 may be fastened to the engine using one or more securing devices. In one example, the securing device includes the air filter fastener 15 and/or the mounting grip 16. The air filter fastener 15 may pass through the air filter 17 and secure the air filter 17 to the air cleaner 100 and to the engine. Other securing devices may include a bolt and wing nut or a snap fit device.

The air cleaner housing 13 may include multiple openings for receiving the combination of air and debris and expelling separated air and debris. The debris may include dirt, dust, grass, cellulose, insects, wood, or other particles. An inlet opening in the air cleaner housing 13 is configured to receive an incoming flow of air from a blower of the engine. The inlet opening is directly connected to the air injection cavity 23, which is an air entry cavity coupled with the inlet opening of the air cleaner housing 13.

From the air injection cavity 23, as illustrated by arrow A1, the combined air and debris flows to a set of flow tubes 10. The set of flow tubes 10 are configured to divide the flow of air from the air entry cavity and remove debris from the flow of air. The flow tubes 10 may be turbulent flow tubes configured to convert one or more laminar flows into one or more turbulent flows. The laminar flow, or streamline flow, may include multiple parallel air flows. The parallel air flows may include air that flows in substantially parallel lines (e.g., within a predetermined angle such as 5, 10, or 20 degrees). The turbulent flows includes multiple direction changes and/or magnitude changes in a cross section of the air flow. The set of flow tubes 10 receives the flow of air and disrupts the flow of air.

The air flow through the set of flow tubes 10 is in a first direction (e.g., vertically up) and through the air filter 17 in a second direction different that the first direction. The first direction may be substantially vertically up (e.g., within a set angle such as 5, 10, less than 45 degrees with the direction of gravity, or another angle). The second direction may be vertically in substantially the down direction (e.g., within a set angle such as 5, 10, less than 45 degrees with the direction of gravity, or another angle). The second direction may include a substantially horizontal direction (e.g., within a set angle such as 5, 10, less than 45 degrees with the horizontal direction, or another angle).

The set of flow tubes 10 includes inner tube 11, the outer tube 12, and the air vane 14. The air vane 14 may be supported by the outer tube 12. The air vane 14 may be a static actuator or agitator. In dome embodiments the air vane 14 may be static in that it does not move relative to the flow tube supporting the air vane, relative to the air cleaner, or relative to the engine. In other embodiments, the air vane 14 may be variably positioned in that it moves relative to the inner tube 11, the outer tube 12, the air cleaner housing, or a portion of the engine. The air vane 14 is an agitator in that it agitates the flow of air. The air vane 14 may be a centrifugal agitator that applies a centrifugal to the flow of air. The air vane 14 may include a directional curved surface such as a cork screw surface that steers the air flow in multiple direction. The air vane 14 may include multiple directional curved surfaces. The air vane 14 extends from a first traverse plate to a second traverse plate. The traverse plates may be C-shaped or moon shaped. The traverse plates may include a closed portion that blocks the flow of air and an open portion that permits the flow of air to pass. The first traverse plate is rotated with respect to the second traverse plate so that the flow of air must change direction and/or magnitude to pass the first and second traverse plates.

Each of the set of flow tubes 10 may include inner tube 11 and the outer tube 12. The inner tube 11 may form the outlet of the flow tube, and the outer tube 12 may form the inlet of the flow tube. The inner tube 11 may overlap the outer tube 12 (e.g., a particular cross section of the flow tube 10 may intersect both the inner tube 11 and the outer tube 12). The inner tube 11 may be partially inserted in or mated with the outer tube 12. The overlap or intersection of the inner tube 11 and the outer tube 12 may form a centrifugal flow opening for the centrifugal flow of air leaving the air vane 14 of the outer tube 12. The centrifugal force may expel the debris, with or without air, through the centrifugal flow opening, as illustrated by arrow A2.

The inner tube 11 and the outer tube 12 may also be defined according to size. The outer tube 12 may have a substantially constant diameter from the inlet of the flow tube to the intersection with the inner tube 11. The inner tube 11 may include a variable diameter that changes in size from the intersection with the outer tube 12 to the outlet of the flow tube. The inner tube 11 includes a tapered circumference from a first opening having a first radius to a second opening having a second radius. The inner tube 11 may include a tapered portion and a constant diameter portion.

The debris, as shown by arrow A2, leaves the flow tube in a first flow through the dirt ejection cavity 18. The cleaned air flow (e.g., air with the debris removed) is expelled through the outlet of the flow tube, as illustrated by arrow A3, through output air cavity 25. The ejected debris may be caught in a collection compartment that is removable from the air cleaner housing 13 for emptying the debris. The debris-removed air flow travels through the air filter 17 and to air cleaner outlet 21, as illustrated by arrow A4, and then to the intake of the engine.

Figure 2:
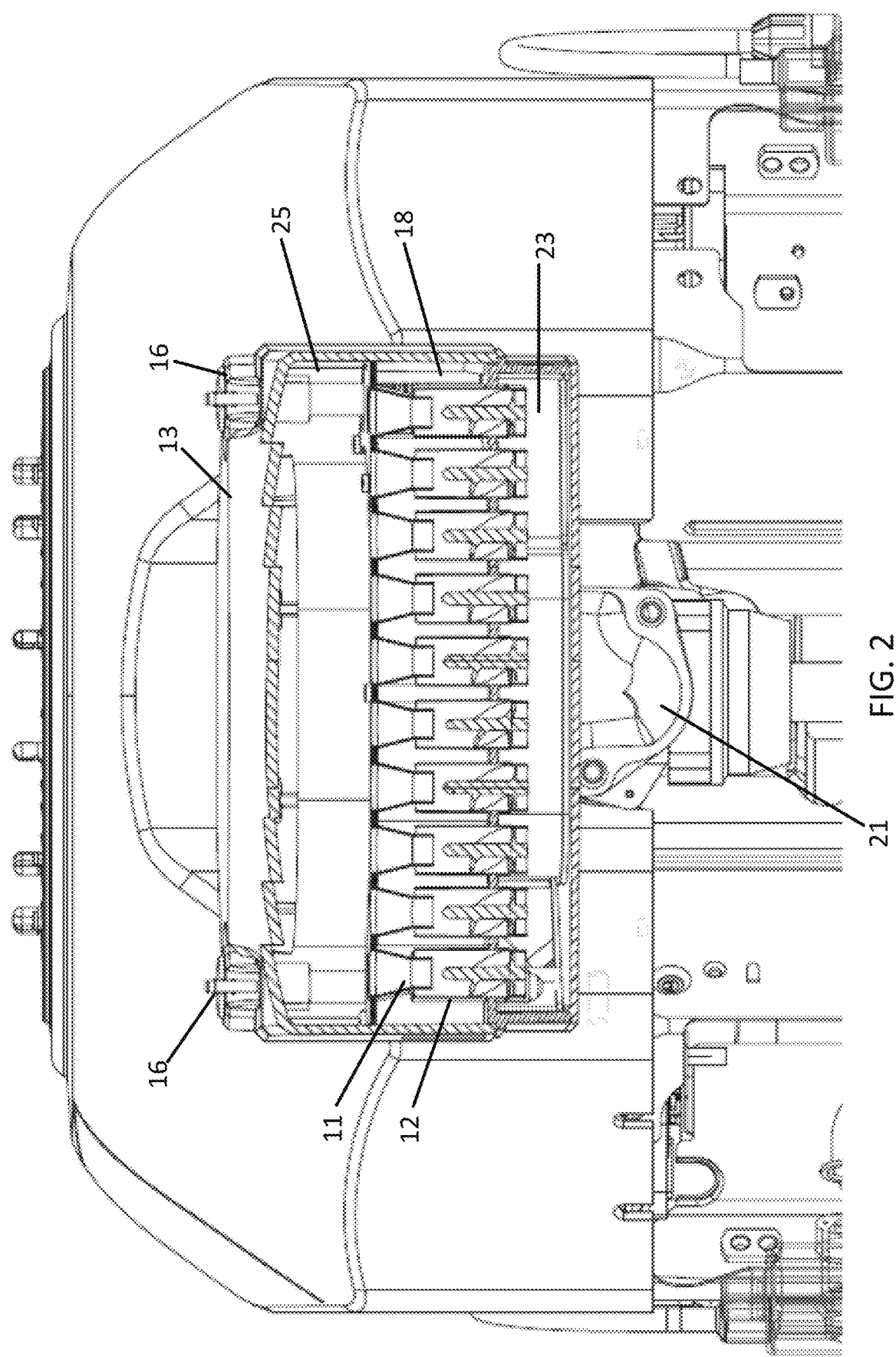
FIG. 2 illustrates a series of flow tubes for the air cleaner.
Figure 3A:
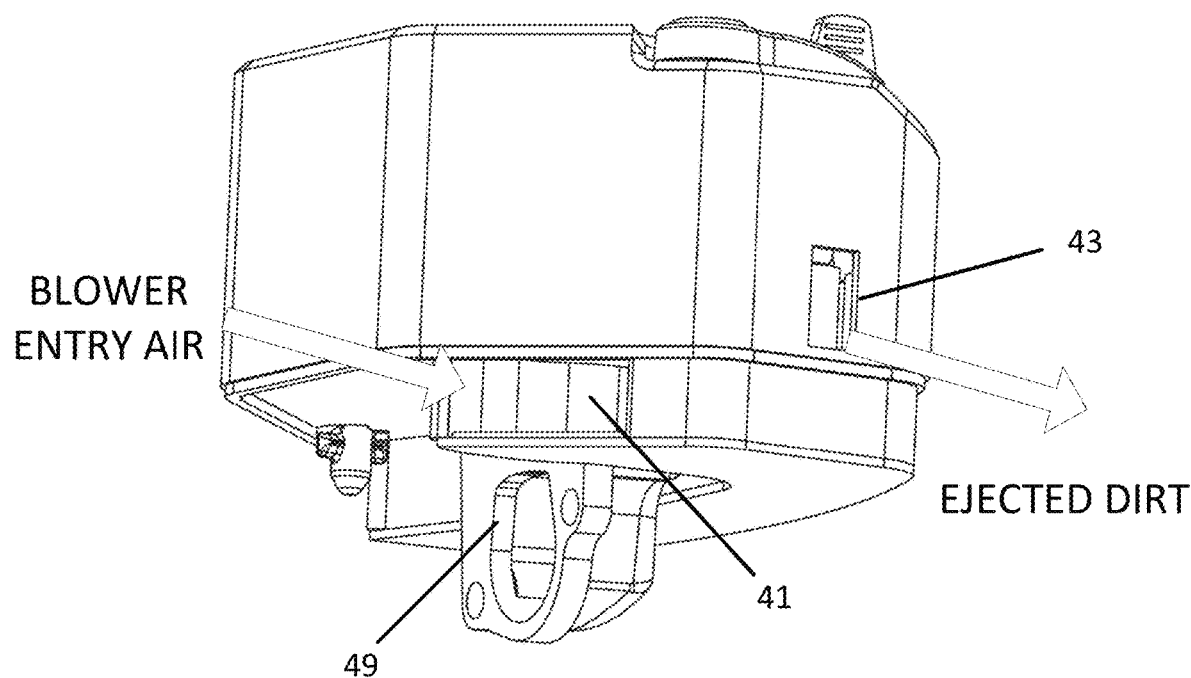
FIG. 3A illustrates a first side view of the air cleaner.
Figure 3B:
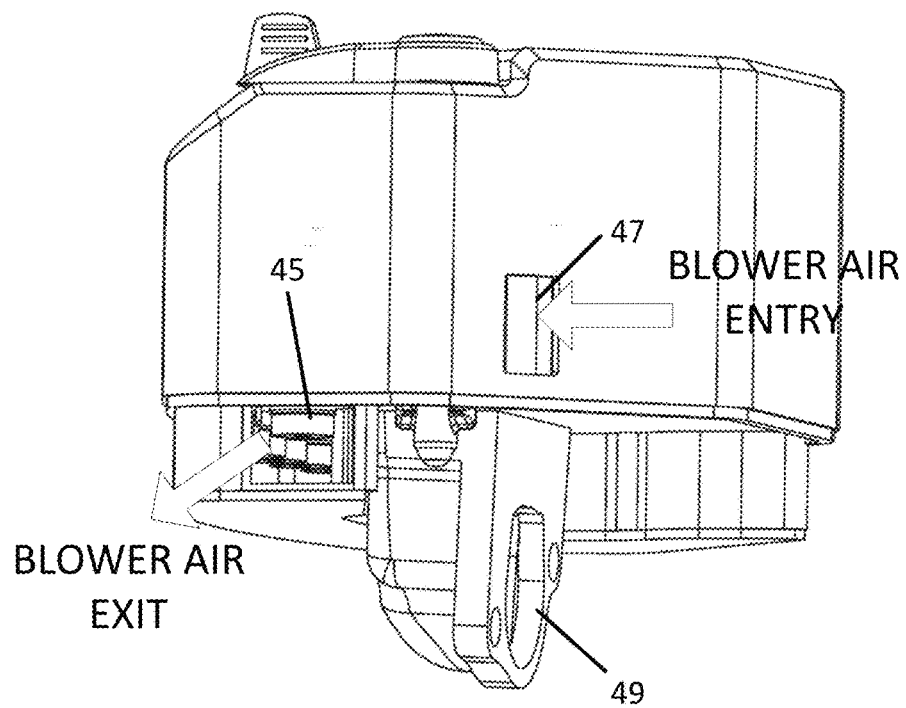
FIG. 3B illustrates a second side view of the air cleaner.

FIG. 2 illustrates a series of flow tubes for the air cleaner 100 of FIG. 1, FIG. 3A illustrates a first side view of the air cleaner 100 of FIG. 1, and FIG. 3B illustrates a second side view of the air cleaner 100 of FIG. 1.

The air cleaner 100 may include multiple inlet air openings. The inlet opening 41 to the air cleaner (labeled blower air entry in FIG. 3A) provides air to the air injection cavity 23 and provides the flow that travels through the flow tube. The inlet opening 47 to the air cleaner (labeled blower air entry in FIG. 3B) provides air to the dirt ejection cavity 18.

In some examples, air is provided to inlet opening 41 from a first cylinder and air is provided to inlet opening 47 from another cylinder. Prior to the air cleaner, the primary function of the air flow is to cool the cylinder head and cylinders. If too much air for one cylinder is bled off to the air cleaning system, that cylinder may over heat. Therefore, inlet opening 41 and inlet opening 47 may bleed air from different cylinders so that too much air is not bled from one cylinder. The arrangement of inlet opening 41 and inlet opening 47 to bleed some air away from both cylinders to prevent overheating in one or both cylinders. A cooling air flow fan may be sized to accommodate both cooling air flow and air filtering/combustion air flow.

The dirt or debris (labeled ejected dirt in FIG. 3A) is expelled through a first outlet opening 43 in the air cleaner housing coupled to the set of turbulent flow tubes and configured to expel the debris from the air cleaner housing. The dirt ejection cavity 18 or debris exit cavity is coupled with the turbulent flow tubes and the first outlet opening 43 in the air cleaner housing 13.

The excess air (labeled blower air exit in FIG. 3B) is expelled through a second outlet opening 45 in the air cleaner housing coupled to the set of turbulent flow tubes and configured to expel excess air from the air cleaner housing. The air output cavity 25 or air exit cavity is coupled with the turbulent flow tubes and the second outlet opening 45 in the air cleaner housing 13. The air filter 17 may be located in the air exit cavity to receive air from the turbulent flow tubes and filter the air before being expelled from the second outlet opening 45 in the air cleaner housing 13.

The combustion air travels through a third outlet opening 49 in the air cleaner into the engine. The third outlet opening 49 may be connected the air intake manifold of the engine through a sealing device 51.

Figure 4:
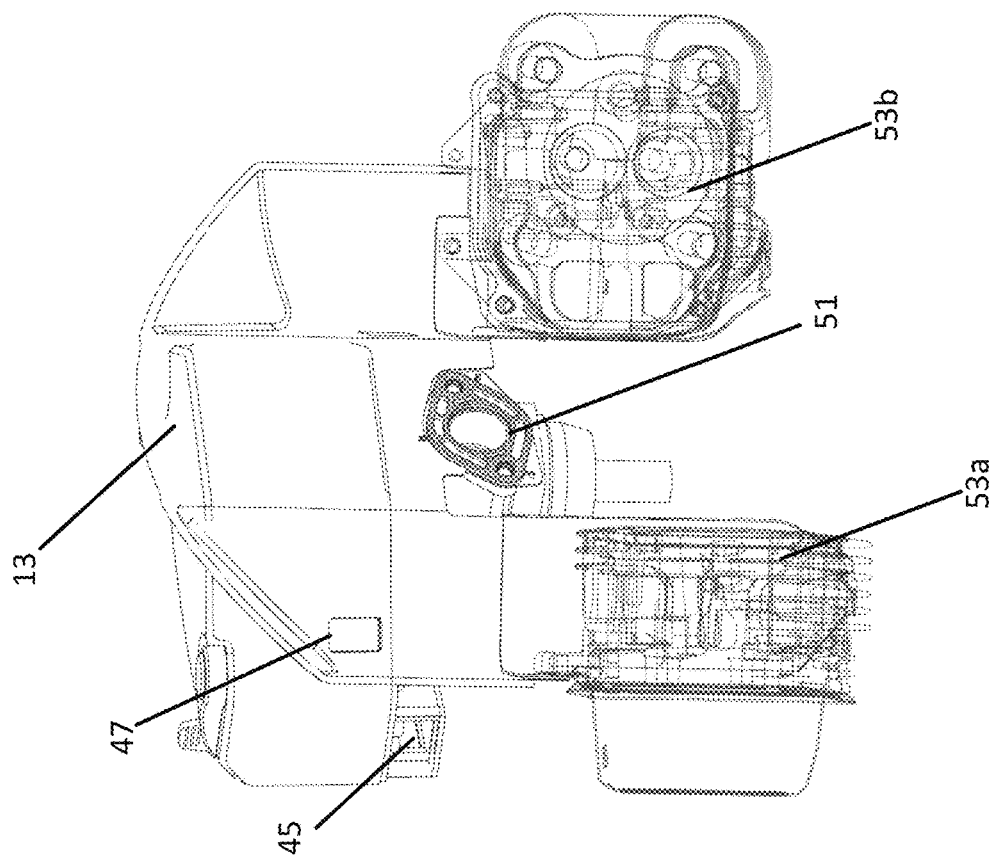
FIG. 4 illustrates an assembly for the air cleaner.
Figure 4:
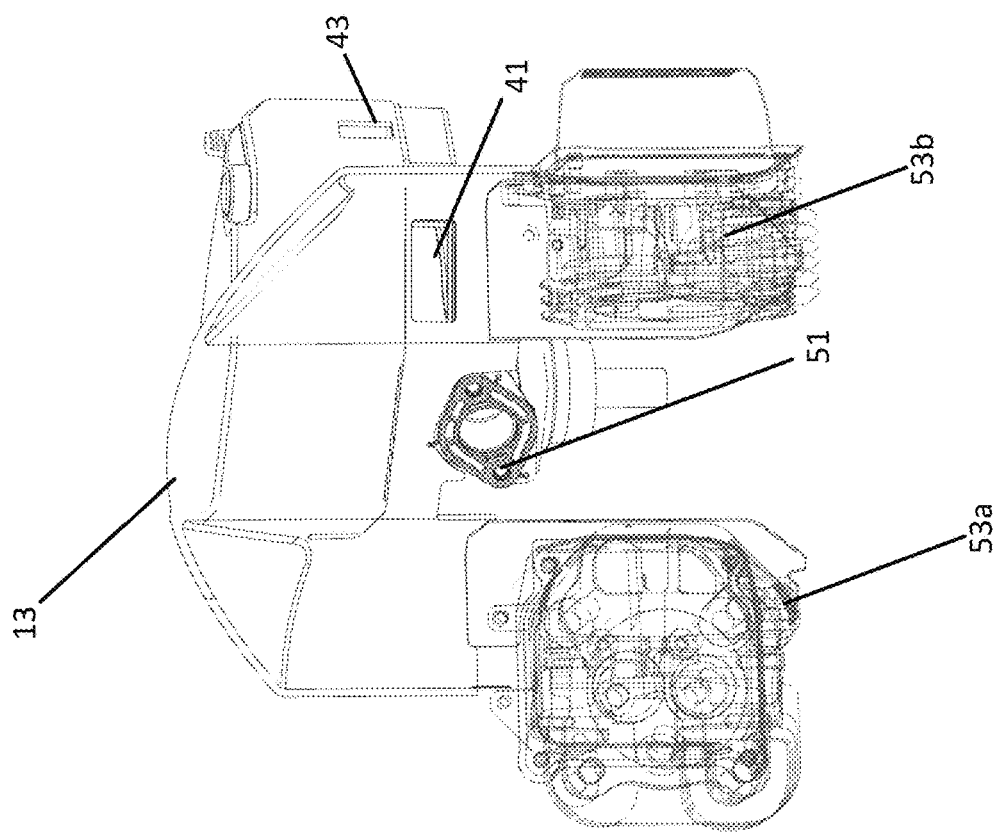

FIG. 4 illustrates an assembly for the air cleaner including the sealing device 51 and left side cylinder head 53a and right side cylinder head 53b. The left side cylinder head 53a and right side cylinder head 53b may define a combustion chamber for the engine. The left side cylinder head 53a and/or the right side cylinder head 53b may define a space for providing air and fuel to the respective cylinder. The left side cylinder head 53a and/or the right side cylinder head 53b may define a space for exhaust to be expelled from the respective cylinder. FIG. 4 illustrates the relative location of the inlet opening 41 to the air cleaner to provide air to the air injection cavity, the inlet opening 47 to the air cleaner to provide air to the dirt ejection cavity, the outlet openings 43 and 45 connected to the set of turbulent flow tubes and configured to expel the debris from the air cleaner housing. The first and second cylinders may be different cylinders, and the first and second locations may be locations at the same cylinder or different cylinders.

Figure 5:
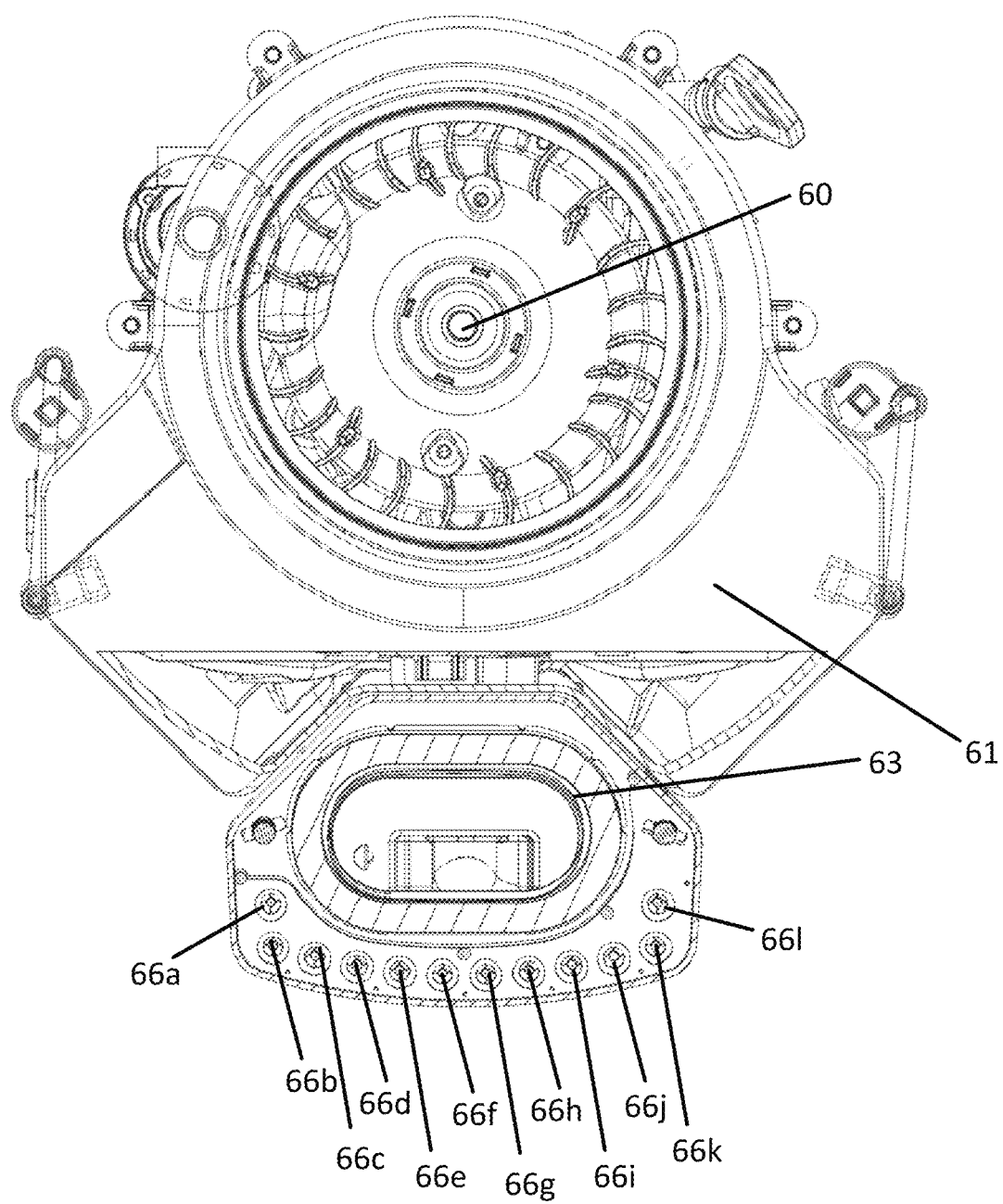
FIG. 5 illustrates a cross section of the air cleaner and engine.

FIG. 5 illustrates a cross section of the air cleaner and engine including intake manifold 61. A fan shaft 60 supports a centrifugal fan or blower that generates a positive pressure or positive air flow that provides the flow of air to the blower air entry 41 and blower air entry 47.

As described above debris is separated from the flow of air using cavities 66a-l that each contain a flow tube, and the cleaned air flows through the air filter compartment 63 and then to the intake manifold 61. The cavities 66a-l may be formed in a variety of arrangements.

In one arrangement, the cavities and corresponding turbulent flow tubes are arranged along a longitudinal side of the air cleaner housing 13. Examples of cavities arranged along the longitudinal side include two or more of 66b-k.

In one arrangement, the cavities and corresponding turbulent flow tubes are arranged along another side of the air cleaner housing, such that the other side is substantially perpendicular to the longitudinal side. Examples of cavities that are not arranged along the longitudinal side include cavities 66a and 66l.

In one arrangement, the cavities and corresponding turbulent flow tubes are arranged along the circumference of the air cleaner housing 13. Examples of cavities that are arranged along the circumference may include cavities 66a-l. The span of the cavities along the circumference may extend for a predetermined portion of the air cleaner housing 13. The span may be measured in an angle from the center of the air cleaner housing 13. The cavities may be arranged for a span greater than 90 degrees radially of the circumference of the air cleaner housing 13. Cavities 66c-j may extend for a span of approximately 90 degrees of the air cleaner housing 13.

The span of the cavities may be a predetermined fraction of the cross sectional area of the air cleaner housing 13. In one example, the quantity of cavities, and corresponding turbulent flow tubes, corresponds to a predetermined fraction of the cross sectional area. Example fractions include ¼, ⅓, or ½ of the area of the air cleaner. In one example, the quantity of cavities, and corresponding turbulent flow tubes, corresponds to a size of the third outlet opening 49 in the air cleaner housing.

In one arrangement, the cavities and corresponding turbulent flow tubes are arranged such that at least two of the cavities 66a-l, and corresponding turbulent flow tubes, are arranged in a first direction and at least two of the plurality of turbulent flow tubes are arranged in a second direction. For example, cavities 66a and 66b are arranged in a first direction and cavities 66c and 66d are arranged in a second direction. Other examples are illustrated.

Figure 6A:
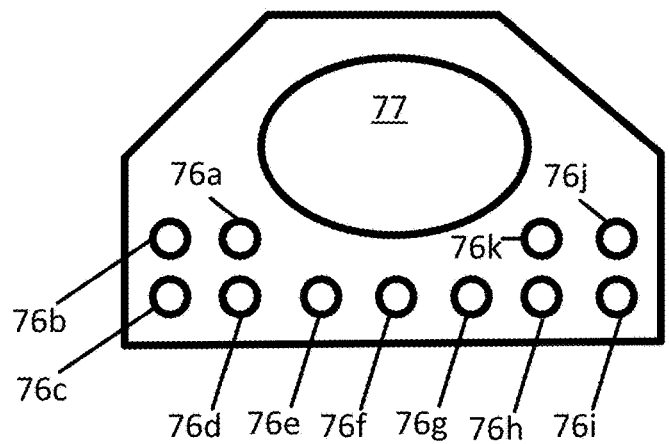
FIGS. 6A, 6B, and 6C illustrate example layouts for the flow tubes.
Figure 6B:
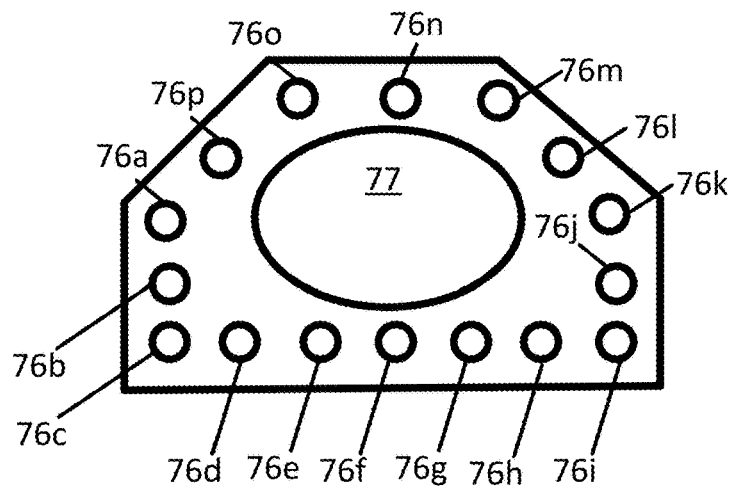
Figure 6C:
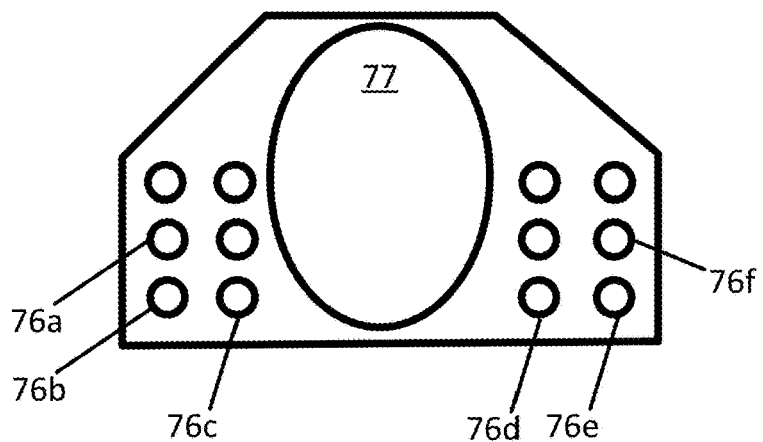

FIGS. 6A, 6B, and 6C illustrate example layouts for the flow tubes. In FIG. 6A multiple row of flow tubes are arranged in multiple directions around the air filter 77. For example, a first row of flow tubes 76b and 76c and a second row of flow tubes 76a and 76d and in a first direction, and a first row of flow tubes 76k and 76i and a second row of flow tubes 76f and 76g are in a second direction.

In FIG. 6B the flow tubes 76a-p are arranged around the entire circumference of the air cleaner housing and around the entire circumference of the air filter 77. The flow tubes are arranged on multiple sides of the air cleaner housing and multiple sides of the air filter 77. Flow tubes 76a-c are arranged on a first side, flow tubes 76d-h on a second side, flow tubes 76i-k on a third side, flow tubes 76l-m on a forth side, flow tube 76n on a fifth side, and flow tubes 76o-p on a sixth side. In FIG. 6C the flow tubes 76 are arranged on opposites sides of the air cleaner housing and the air filter 77.

Figure 7A:
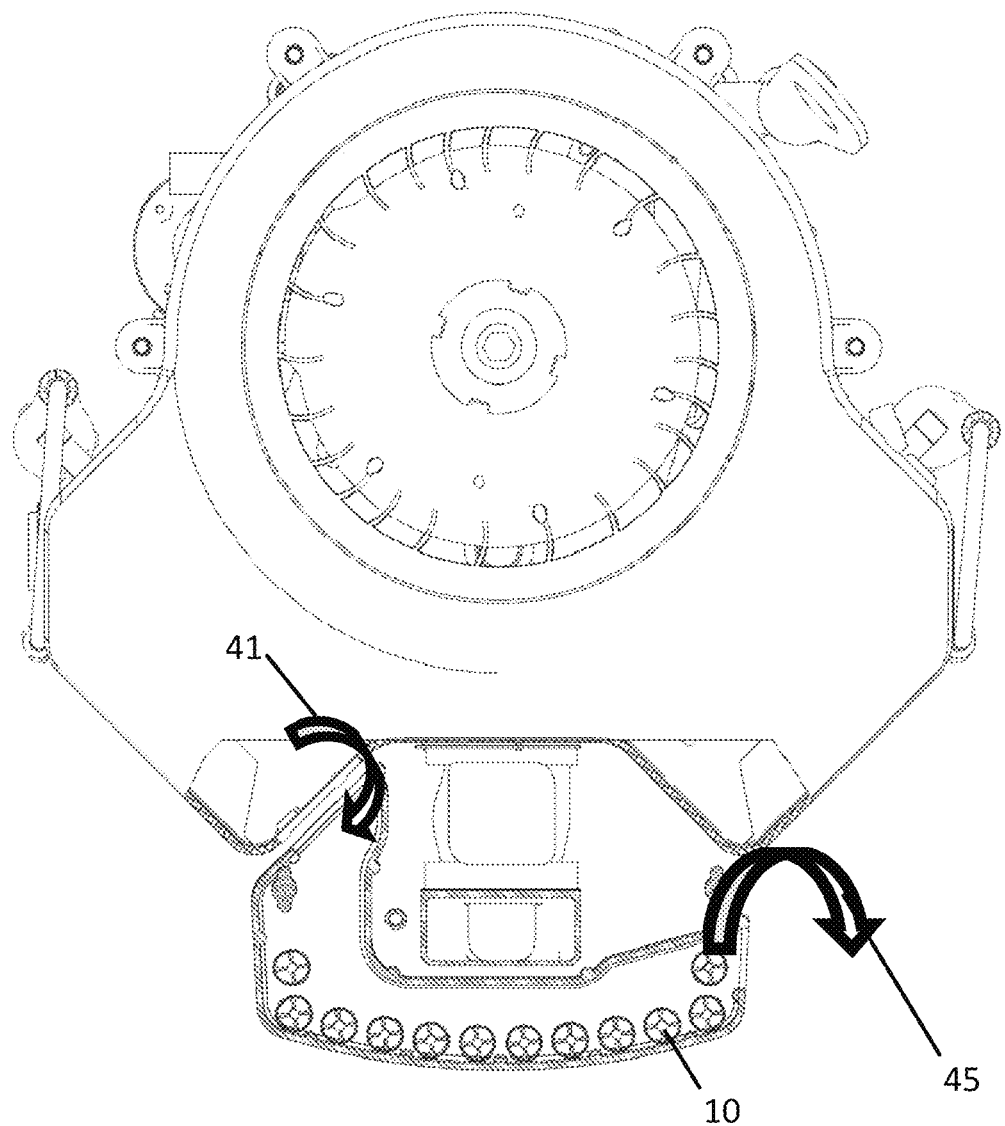
FIG. 7A illustrates a cross section of a first flow path through the air cleaner.
Figure 7B:
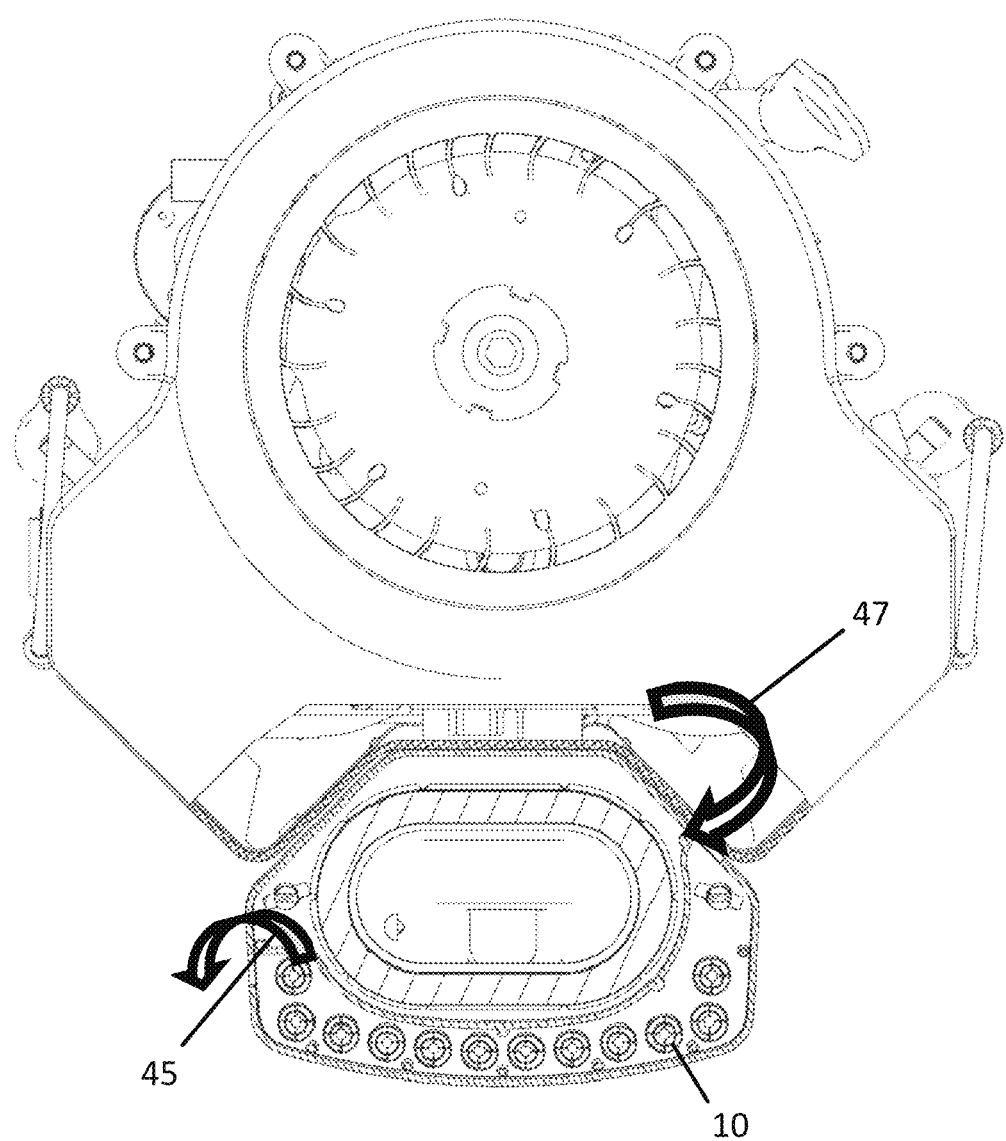
FIG. 7B illustrates a cross section of a second flow path through the air cleaner.
Figure 8:
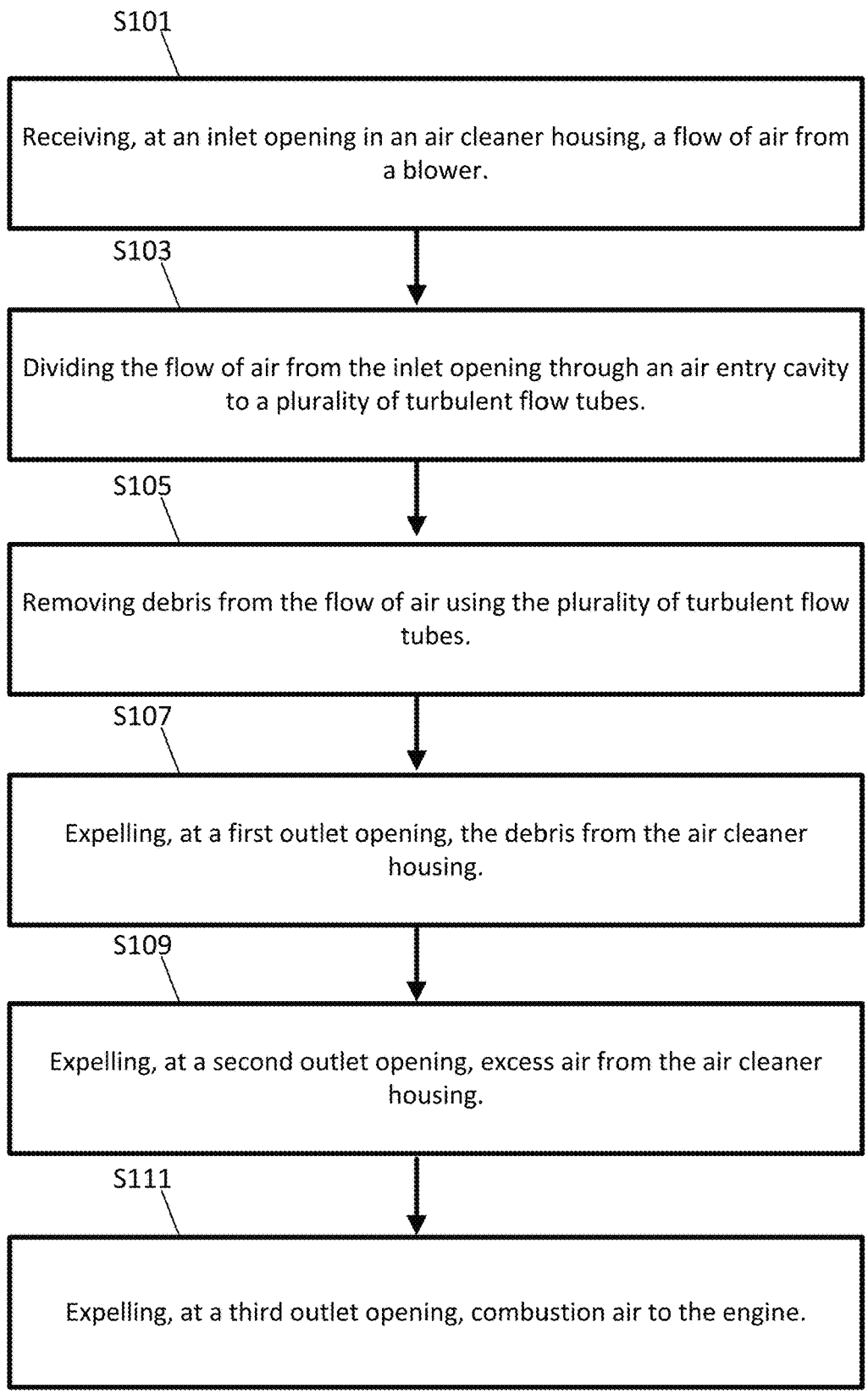
FIG. 8 illustrates an example flowchart for the operation of the air cleaner.

FIG. 7A illustrates a cross section of a first flow path through the air cleaner. A first air flow enters inlet opening 41 from a first location or cylinder. The ambient, uncleaned air is provided to the flow tubes 10 from the inlet opening 41 and excess air is exhausted at outlet 45. FIG. 7B illustrates a cross section of a second flow path through the air cleaner. The second flow path from the inlet opening 47 and blows the dust separated by the flow tubes 10 from the dust collection duct and it expelled from outlet 45. FIGS. 7A and 7B illustrate an embodiment with a common outlet flow output (e.g., outlet 45), as an alternative to the separate outlets 43 for dirt ejection (e.g., as illustrated in FIG. 3A) and outlet 45 for combustion air (e.g., as illustrated in FIG. 3B). FIG. 8 illustrates an example flowchart for the operational sequence of the air cleaner. Different, fewer or additional acts may be included. At act S101, the sequence includes receiving, at an inlet opening in an air cleaner housing, a flow of air from a blower. At act S103, the sequence includes dividing the flow of air from the inlet opening through an air entry cavity to a plurality of turbulent flow tubes. At act S105, the sequence includes removing debris from the flow of air using the plurality of turbulent flow tubes. At act S107, the sequence includes expelling, at a first outlet opening, the debris from the air cleaner housing. At act S109, the sequence includes expelling, at a second outlet opening, excess air from the air cleaner housing. At act S111, the sequence includes expelling, at a third outlet opening, combustion air to the engine. In addition, the sequence may include filtering the flow of air after debris is removed by the plurality of turbulent flow tubes. In addition, the sequence may include directing the flow of air across a spiral vane in an outer tube and separating the debris from the flow of air at an inner tube mated with the outer tube.

The engine may be included in an engine-generator set, which may be referred to as a generator or a genset, may include an engine driven alternator or another combination of devices for generating electrical energy or power. One or more generators may provide power to a load through a generator bus. The generator bus is an electrical conductive path and may be selectively connected through multiple circuit breakers or other types of switches to the generators, the utility system, and other devices. Other systems in the engine may include a fuel tank, a fuel line, a retractable starter, a starter handle, an air cleaning system, a muffler, a control portion, a governor system, a throttle system, and a lubrication system.

Figure 9:
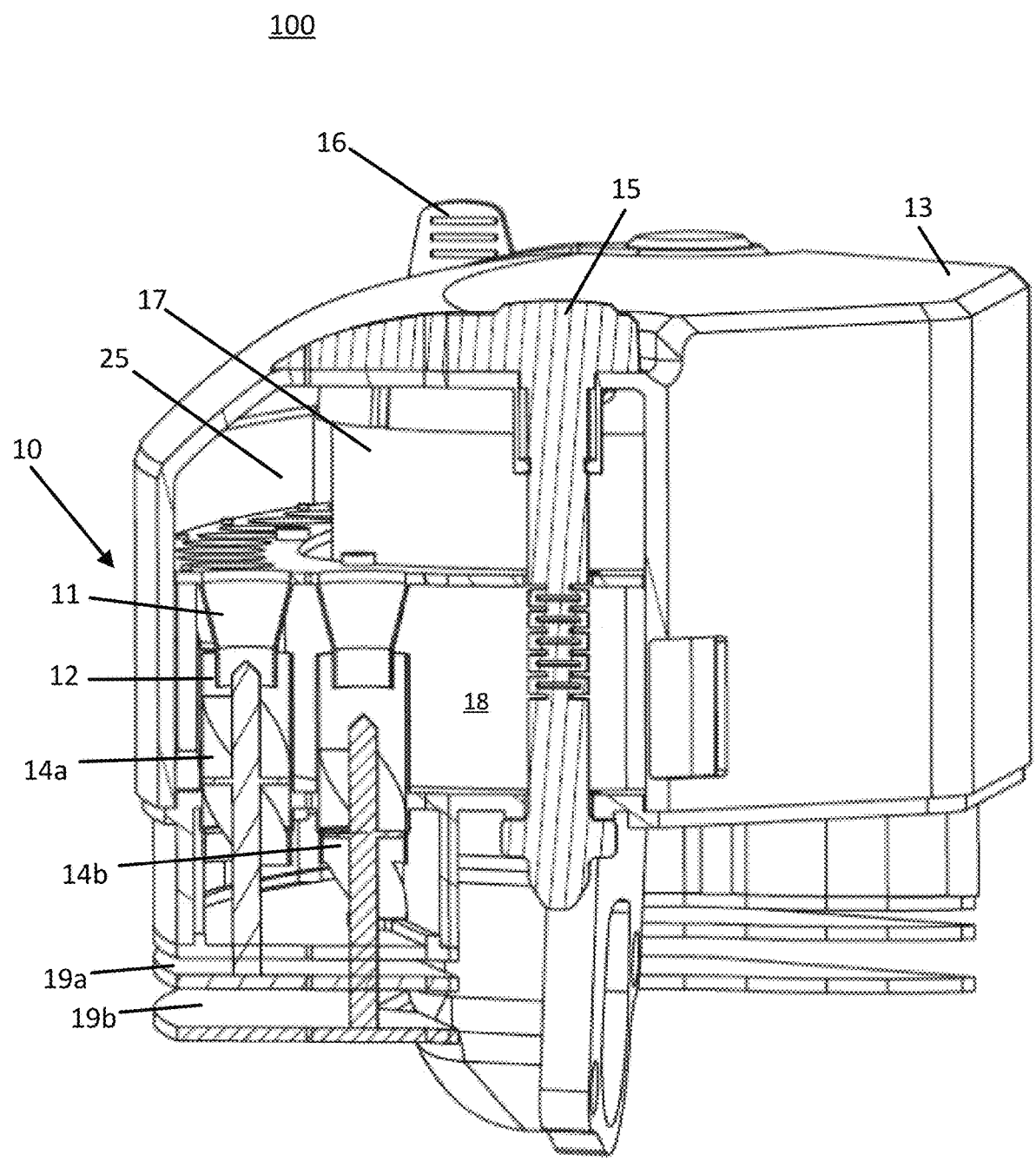
FIG. 9 illustrates an air cleaner with variable position flow tubes.

FIG. 9 illustrates an air cleaner 100 with variable position flow tubes 10. The embodiment of FIG. 9 includes similar components for the housing 13, the air filter fastener 15, the mounting grip 16, the air filter 17, the output air cavity 25, and the dirt ejection cavity 18 as described in embodiments above. Additional, different, or fewer components may be included. For example, the variable position flow tube 10 may be adjusted manually or by hand.

The variable position flow tube 10, or turbulent flow tube, may include an inner tube 11 and an outer tube 12, and an air vane 14 that is movable between different positions. In FIG. 9 two air vanes are illustrated including air vane 14a in an upper position and air vane 14b in a lower position. Air vanes 14a and 15b and/or air vanes of all of the flow tubes 10 may be referred to collectively or individually as air vane 14.

The air vane 14a in the upper position may correspond to a low combustion flow position or a low power position. The position for low combustion or the position for low power corresponds to the engine running below a threshold speed or connected to less than a threshold load. A greater length of the air vane 14a in the corresponding flow tube 10 for the air vane 14b, increases the air flow rotation intensity and improves the efficiency of dust separation.

The air vane 14b in the lower position may correspond to a high combustion flow position or a high power position. The position for high combustion or the position for high power corresponds to the engine running above a threshold speed or connected to more than a threshold load. A shorter length of the air vane 14b in the corresponding flow tube 10 for the air vane 14a, decreases the air flow rotation intensity but reduces the combustion air flow restriction, thus improving engine power (over the more restrictive upper position). Higher flow rates through a fixed diameter tube generate higher flow velocities. Thus, sufficient air rotating speed to centrifuge dirt out of the air stream may be developed with a shorter length of the air vane 14b.

The threshold speed may be a predetermined number of revolutions per minute (RPM). The threshold speed may be selected according to the model of engine, the type of device including the engine, or the ambient conditions of the engine. For example, a first threshold speed may be used for lawn equipment and a second threshold speed may be used for pumps. The threshold load may be determined by measuring the dirt separation efficiency at increasing loads and assigning the threshold load at the highest load in which the desired dirt separation efficiency is maintained.

More air is consumed by the engine at wide open throttle (maximum power at a given RPM) than at partial throttle openings (e.g. 0% to 50% of max power). More air is consumed at higher RPM than at low RPM. The threshold for changing the flow tube 10 or vane 14 configuration to a lower state of rotating speed may be a specific proportion of percentage of the rated RPM or the load. For example, the specific portion or percentage may be about % or 75% load and 75% of rated RPM. An example engine might be rated at 3600 RPM to make maximum horsepower 25 hp, which corresponds to a threshold for speeds above 2700 RPM and loads greater than 19 horsepower, to cause the flow tubes 10 or vanes 14 to be adjusted to the lower position.

One or more sensors may be used to measure the power or speed of the engine. The type of sensor may be a torque sensor, a deflection sensor, a dynamometer, a positional sensor, or a revolution sensor. The deflection sensor may measure a deflection of the crankshaft or another device. The deflection sensor may include two position sensors. The position sensors may be associated with different ends of the rotor shaft. As an example, the sensor may be a positional sensor (e.g., position sensor or accelerometer) that may measure the change in rotation of a crankshaft or other component of generator. The revolution sensor may be a magnetic sensor that detects a change in a magnetic field, an optical sensor that detects indicia on the component, a contact sensor that detects a tab or protrusion on the crankshaft, or another component.

A control plate 19a is attached to and operable to move air vane 14a in and out of contact with the flow tube 10. That is the control plate 19a is moved away from or towards the air cleaner 100 in order to adjust the amount of overlap between the air vane 14a and the flow tube 10. A control plate 19b is attached to and operable to move air vane 14b in and out of contact with the flow tube 10. That is the control plate 19b is moved away from or towards the air cleaner 100 in order to adjust the amount of overlap between the air vane 14b and the flow tube 10. Control plates 19a and 19b may be referred to individually or collectively as control plate 19.

The control plates 19a and 19b may individually be attached to and operable to control individual air vanes (e.g., air vanes 14a and 14b). The control plates 19a and 19b may each be attached to different groups of air vanes. For example, referring to FIG. 6A with multiple row of flow tubes are arranged in multiple directions around the air filter, control plate 19a may be attached to and operable to control a first row of flow tubes including flow tubes 76b and 76c, and control plate 19b may be attached to and operable to control a second row of flow tubes including flow tubes 76a and 76d. In FIG. 6B the flow tubes 76a-p may be grouped in other arrangements. For example, control plate 19a may be attached to and operable to control a group of flow tubes 76a-k and control plate 19b may be attached to and operable to control of flow tubes 76l-n. Similarly in FIG. 6C, control plate 19a may be attached to and operable to control a group of flow tubes on the left side (e.g., including at least flow tubes 76a-c) and control plate 19b may be attached to and operable to control of flow tubes on the right side (e.g., including at least flow tubes 76d-e).

Figure 10:
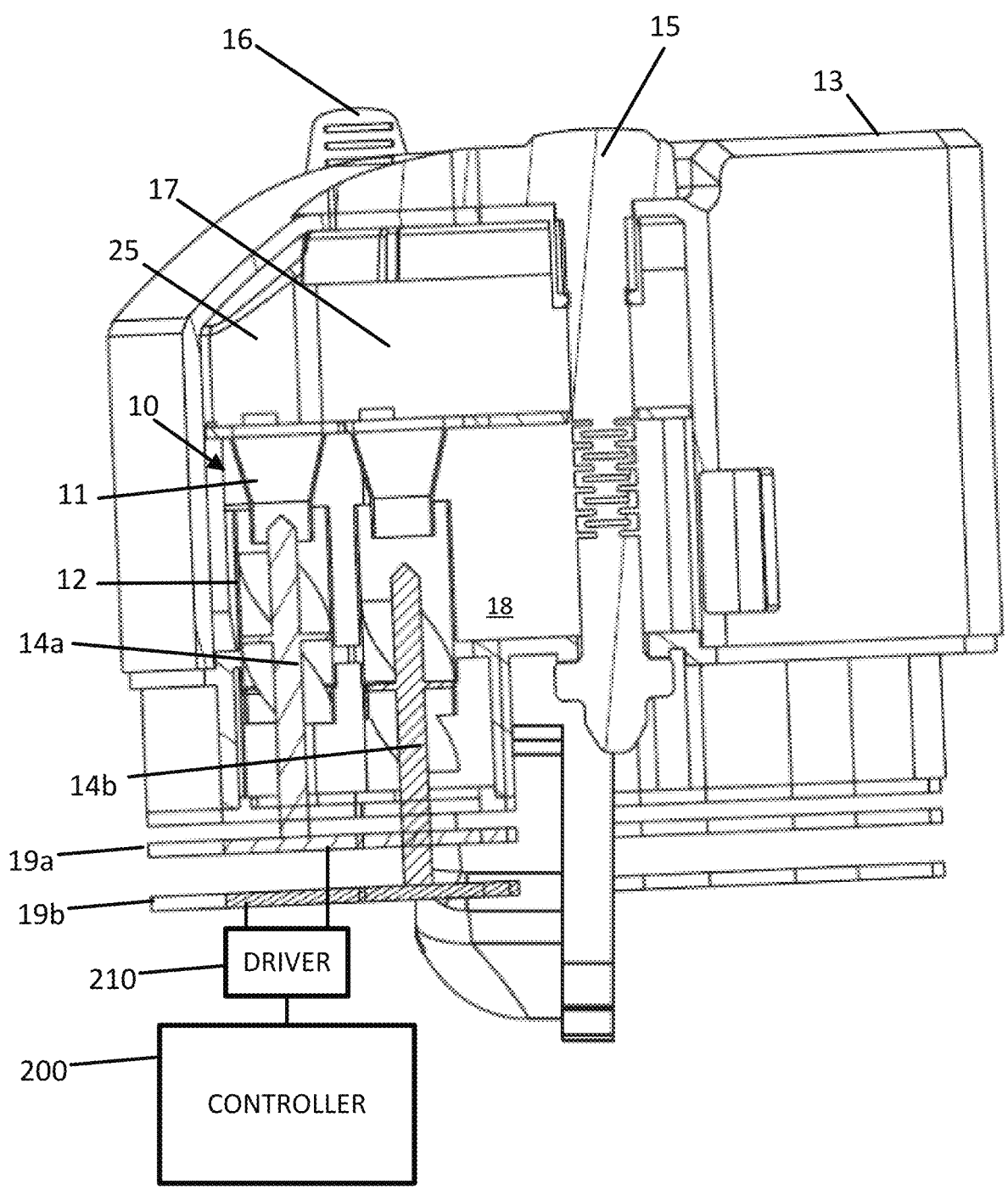
FIG. 10 illustrates another view of the air cleaner of FIG. 9 and a controller for the variable position flow tubes.

FIG. 10 illustrates another view of the air cleaner of FIG. 9 and a controller 200 and a driver 210 for operation of the variable position flow tubes. The driver 210 may include a variety of mechanisms for bringing the attached control plates 19 and associated air vanes 14 in greater or less overlap with the flow tubes 14.

The driver 210 may include a motor, a solenoid, or another device configured to move the control plates 19. The motor may be a stepper motor configured to move the control plates 19 to multiple vertical positions corresponding to different steps or rotation position of the motor. The motor may be connected to the control plate 19 through a rack and pinion or a crankshaft. The controller 200 may generate an input signal that sets a particular position, or increases or decreases the step of the motor.

The solenoid may be configured to move the control plates 19 to multiple vertical positions according to an input signal. Different voltage values for the input signal may corresponds to different positions for the solenoid. The controller 200 may generate the input signal for controlling the solenoid.

The controller 200 may receive sensor data from a sensor array including one or more sensors may be used to measure the power or speed of the engine (e.g., a torque sensor, a deflection sensor, a dynamometer, a positional sensor, or a revolution sensor). The controller 200 generates the input signal for the driver 210 in response to the sensor data by comparing the sensor data, or any combination thereof, to one or more parameters or thresholds.

In another example, the driver 210 may be driven from an engine component and not be driven directly by the controller 200 (e.g., the controller 200 may be omitted). The engine component may include the throttle, the intake manifold, or the cooling fan. The driver 210 may include a mechanical link (e.g., one or more bars or levers) to the throttle. The driver 210 moves the control plate 19 and associated air vane 14 in response to the position of the throttle. The driver 210 may include a vacuum connection (e.g., vacuum signal or vacuum pipe) from the intake manifold that drives a vacuum motor. The vacuum motor moves the control plate 19 and associated air vane 14 in response to the pressure in the intake manifold. The driver 210 may include an air vane connected to the control plane 19 that moves in response to a cooling fan. Air from the cooling fan moves the air vane. The air vane moves the control plate 19 and associated air vane 14 in response to the pressure in the intake manifold.

Figure 11:
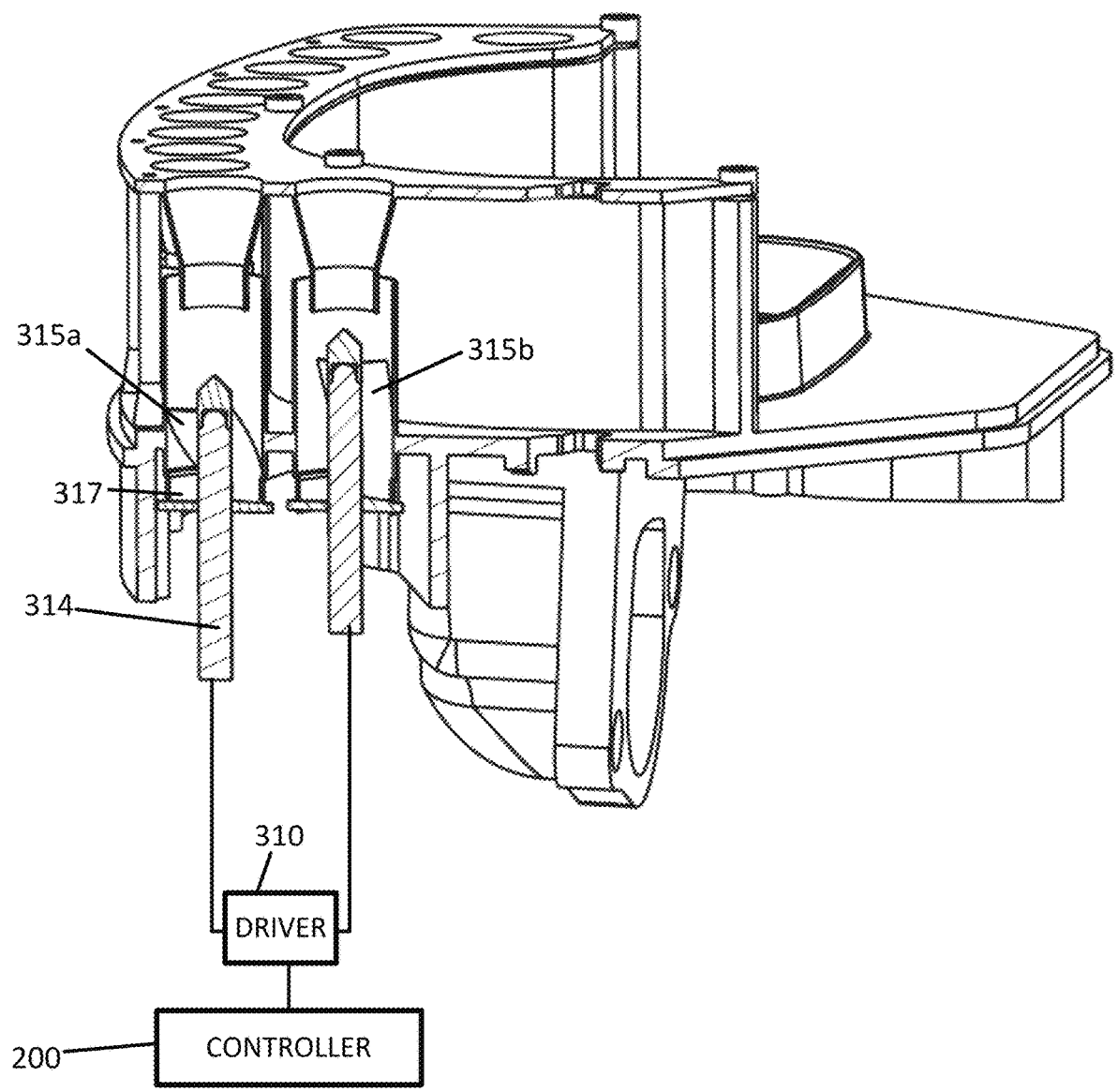
FIG. 11 illustrates an air cleaner with a variable pitch flow tube.
Figure 12A:
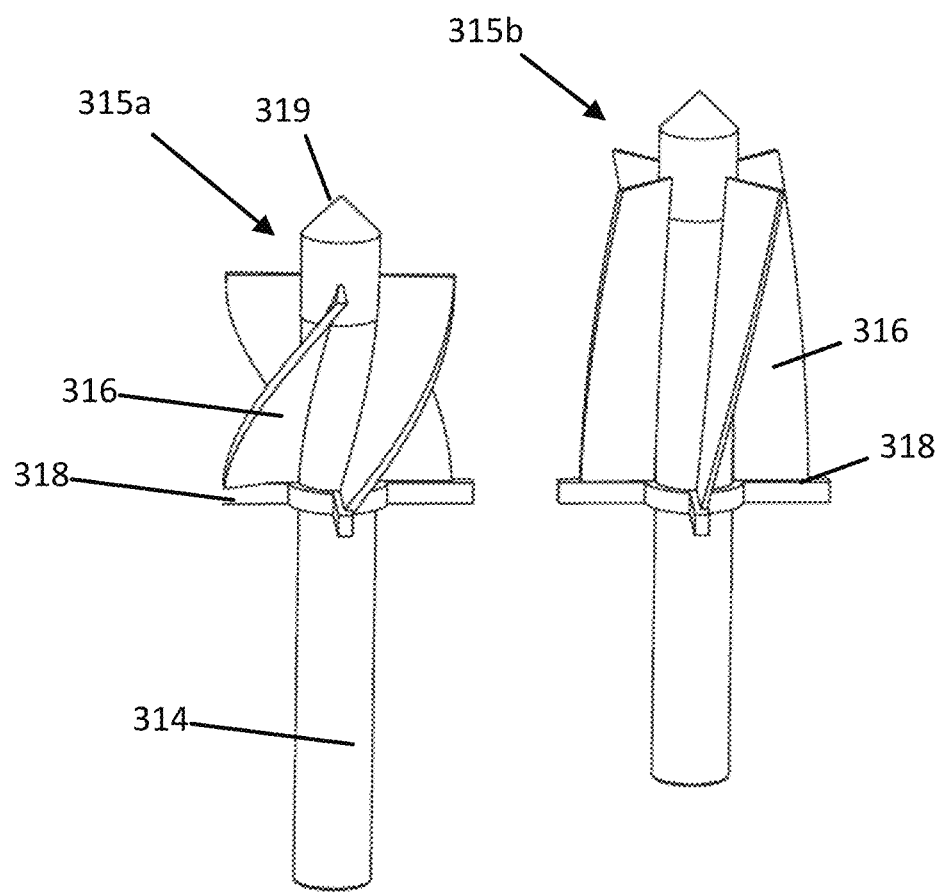
FIGS. 12A and 12B illustrates example variable pitch flow tubes.
Figure 12B:
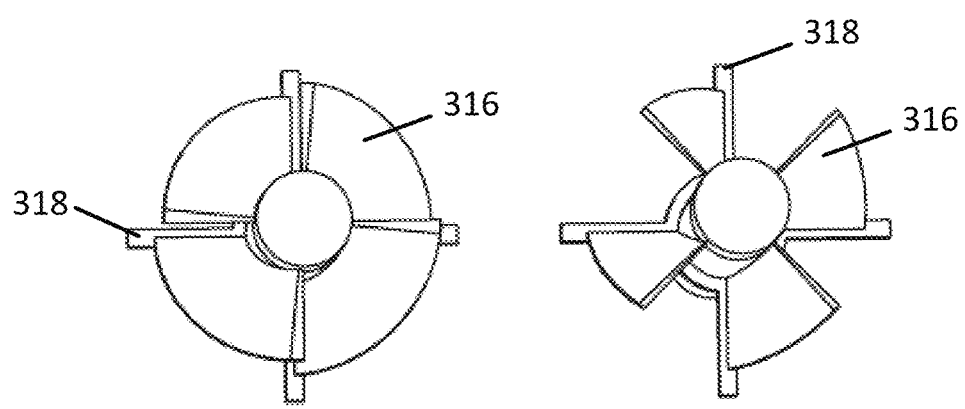

FIG. 11 illustrates an air cleaner with a variable pitch flow tube 314. The pitch of the variable pitch flow tube 314 is adjusted by changing the shape of the blades of the air vane. FIGS. 12A and 12B illustrates example variable pitch flow tubes including a small pitch flow tube 315a and a large pitch flow tube 315b. In one embodiment, the small pitch flow tube 315a and the large pitch flow tube 315b retain their shape over time such that the air cleaner 100 includes a combination of small pitch flow tubes 315a and large pitch flow tubes 315b. In another example, the pitch is adjusted by driver 310 under commands from controller 200. The pitch may be adjusted for individual flow tubes or for groups of flow tubes. Additional, different or fewer components may be included. For example, the variable pitch flow tube 314 may be adjusted manually or by hand.

Controller 200 may generate a command for driver 310 to adjust the pitch in the variable pitch flow tubes 314. The shaft of one or more of the variable pitch flow tubes 314 may be physically connected to the driver 310. Under the direction of the command from the controller 200, the driver 310 moves the shaft relatively into the variable pitch flow tubes 314 to increase the pitch or relatively out of the variable pitch flow tubes 314 to decrease the pitch.

The blade 316 may be formed of a flexible material. The flexible material may be plastic, a fabric, a sheet metal, or another material. In one example, one end (e.g., a top end) of the blade 316 is connected to an end cap 319 of the variable pitch flow tube. The connection may be made with adhesive. The connection may be made by sliding the blade 316 through a slot or other connector of the end cap 319. The other end (e.g., a bottom end) of the blade 316 is connected to a supporting collar 318. The connection may be made with adhesive. The connection may be made by sliding the blade 316 through a slot or other connector of the supporting collar 318. The supporting collar 318 may be secured relative to the housing of the air cleaner. For example, the supporting collar 318 may be to the housing at secure point 317. The secure point 317 may include a groove into which the supporting collar 318 is slidably mounted. That is supporting collar 318 may rotate via secure point 317 (relative to the shaft) as the shaft of the variable pitch flow tube 314 is moved up and down (relative to the supporting collar 318) to adjust the pitch of the blade 316.

The blade 316 may be a torsion spring configured to change the helix angle. The helix angle may be a vertical angle measured from the horizontal plane, which is perpendicular to the shaft of the variable pitch flow tube 314. The blade 316 wraps circumferentially around the shaft of the variable pitch flow tube 314. The pitch of blade 316 describes the angle or degree at which the blade 316 wraps circumferentially around the shaft of the variable pitch flow tube 314. While the blade 316 may not wrap circumferentially around the shaft of the variable pitch flow tube 314 for an entire rotation, the pitch may measure the distance on the shaft of the variable pitch flow tube 314 that would be required for the blade 316 to make an entire rotation at the angle or degree. For example, the pitch of the blade 316 may be the vertical distance necessary for the blade 316 to make a full rotation.

A coarse pitch or a larger pitch means that the blade 316 is steeper, rotates at a larger angle with the horizontal around the shaft, and requires a larger distance to make a full rotation around the shaft of the variable pitch flow tube 314. A fine pitch or a smaller pitch means that the blade 316 less steep, rotates at a smaller angle with the horizontal around the shaft, and requires a smaller distance to make a full rotation around the shaft of the variable pitch flow tube 314. The coarse pitch or the fine pitch may be defined by a predetermined pitch angle with the horizontal or a predetermined pitch distance along the shaft of the variable pitch flow tube 314. Example predetermined distances may be in the range of 3-5 centimeters or 1-30 centimeters. The transition from the coarse pitch to fine pitch may involve a clockwise rotation of the blade 316 relative to the shaft. The transition from the fine pitch to coarse pitch may involve a counter clockwise rotation of the blade 316 relative to the shaft.

The fine pitch corresponds to a low flow and higher flow restriction because it causes the flow to spin at a higher speed (e.g., RPM) and more effectively centrifuges out dirt particles at a low flor rate. The coarse pitch corresponds to a high flow and lower flow restriction because it can cause the air flow to spin sufficiently at high air flow rates. The power output of the engine is lower using the fine pitch because greater combustion air flow restriction is generated, thus limiting the available combustion air volume. The power output of the engine is higher using the coarse pitch because lower combustion air flow restriction is generated, thus improving the available combustion air volume over the more restrictive fine pitch configuration.

The coarse pitch may correspond to a high combustion flow setting or a high power position. The setting for high combustion or the position for high power corresponds to the engine running above a threshold speed or connected to more than a threshold load. The threshold speed may be a predetermined number of revolutions per minute (RPM). The threshold speed may be selected according to the model of engine, the type of device including the engine, or the ambient conditions of the engine, as described in other examples herein.

Figure 13:
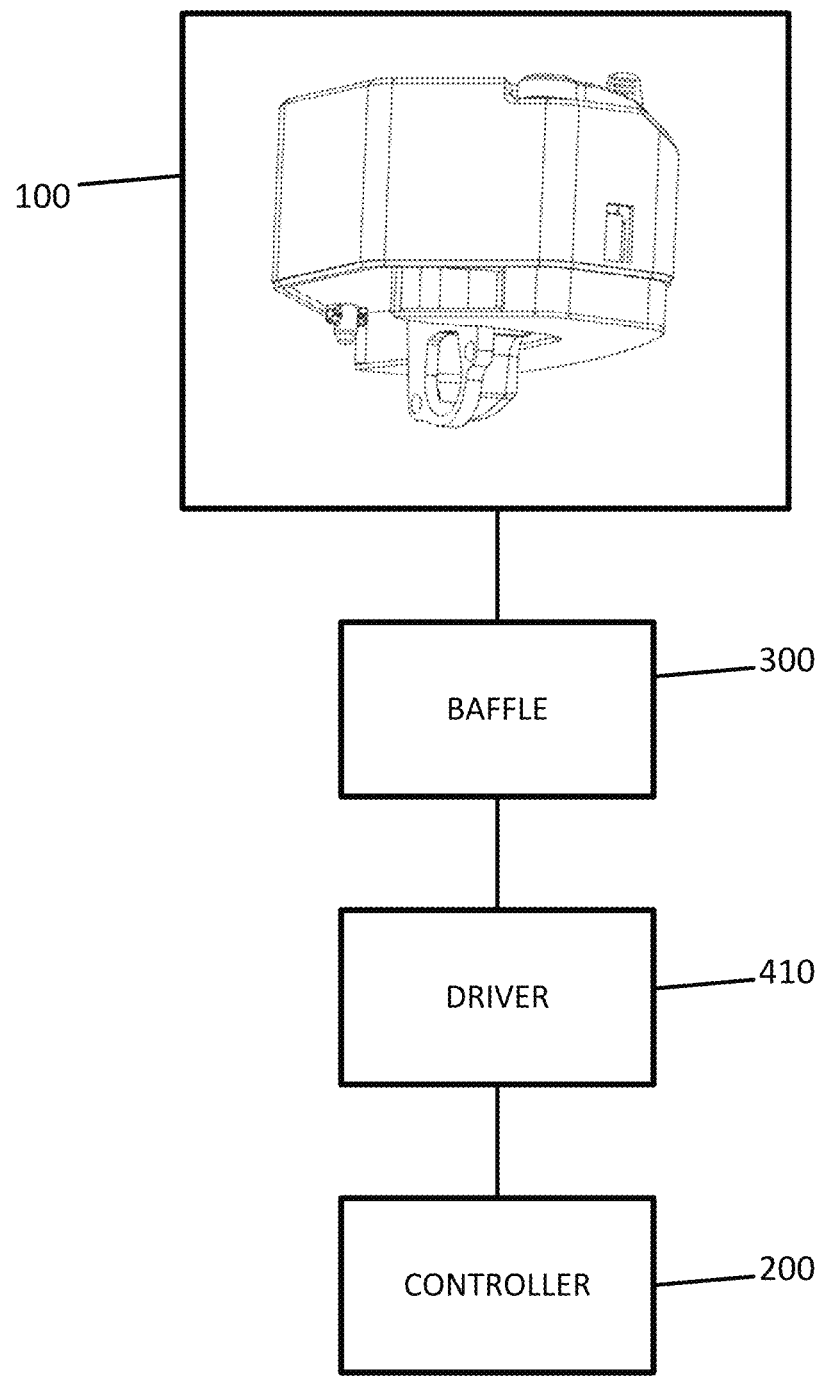
FIG. 13 illustrates an air cleaner with a variable baffle.

FIG. 13 illustrates an air cleaner with a variable baffle 300. One or more variable baffles 300 are configured to control the flow of cooling air into the air cleaner 100 for both the combustion air and the dust evacuating air to prevent engine over-heating. The variable baffle 300 adjusts the flow of air into or out of the air cleaner 100. The variable baffle 300 may be used on one more air inlets for the air cleaner 100 or one or more outlets for the air cleaner 100. Referred to FIGS. 3A and 3B, example inlets include inlet opening 41 and inlet opening 47, and example outlets include a first outlet opening 43, second outlet opening 45, and the third outlet opening 49. Multiple variable baffles 300 may be used on any combination of the inlets and outlets. Addition, different, or fewer components may be included. For example, the variable baffle 300 may be adjusted manually or by hand.

The driver 410 is physically connected to one or more baffles 300 and operates the baffles 300 to selectively open or close the associated inlets or outlets at varying degrees. The driver 410 may be part of a thermostatic control system including a temperature sensor or a heat responsive material. Passive systems (e.g., not requiring a controller) may include a thermostatic wax pellet actuator, a thermostatic (bimetallic) spring, or another device. Active system (e.g., including controller 200) may include an electronic control system using a temperature sensor, a control computer and an electronic actuating device, or a vacuum powered system.

For the passive systems, when the temperature near the heat responsive device reaches a threshold level, the driver 410 actuates to open or close the baffle 300 accordingly. For the active systems, the controller 200 is configured to receive temperature data from one or more sensors. When the temperature data indicates that the temperature exceeds the threshold level, the controller 200 provides a command to the baffle 300 to open or close the baffle 300.

Figure 14:
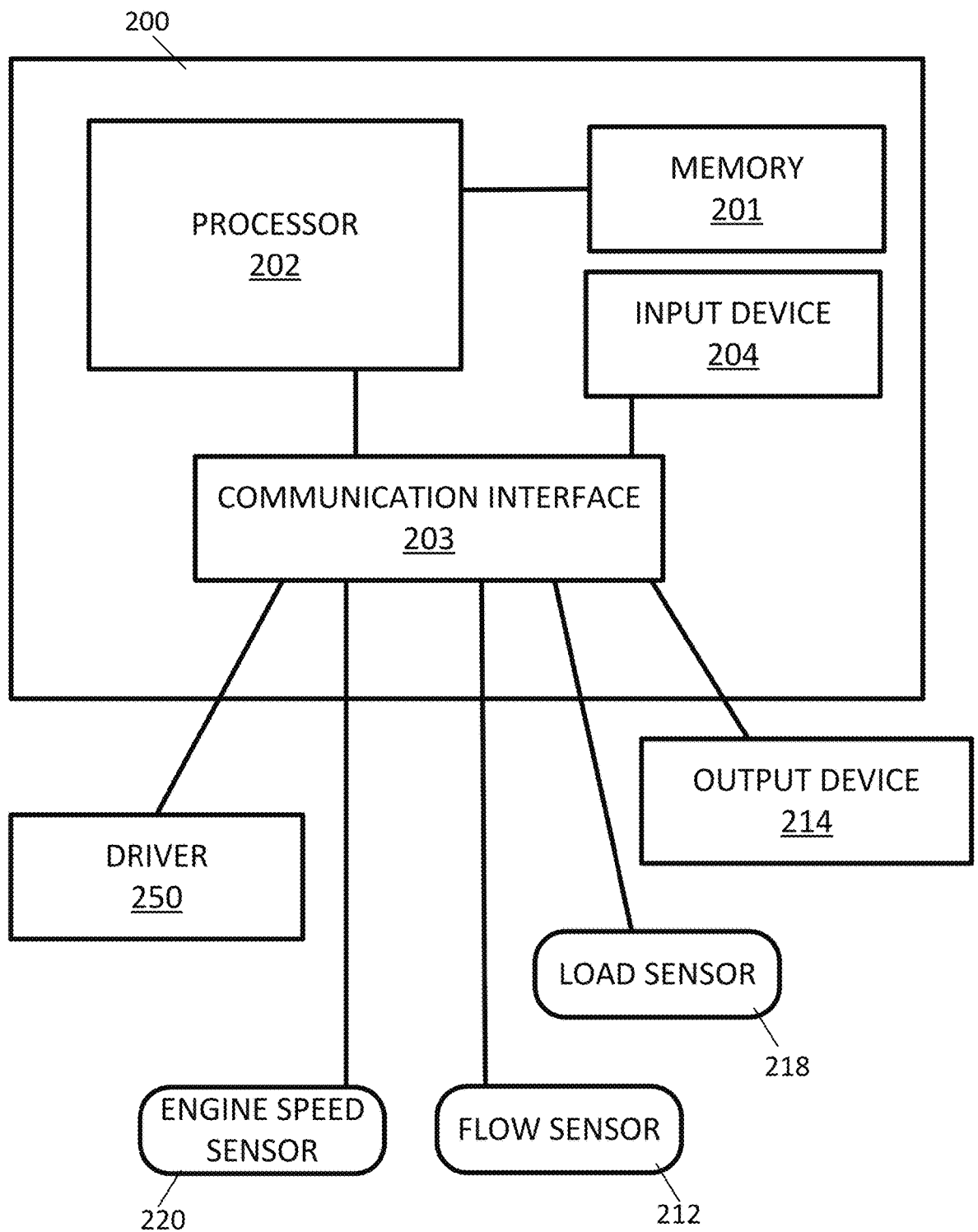
FIG. 14 illustrates an example controller for controlling at least one of the examples of FIG. 9-13.
Figure 15:
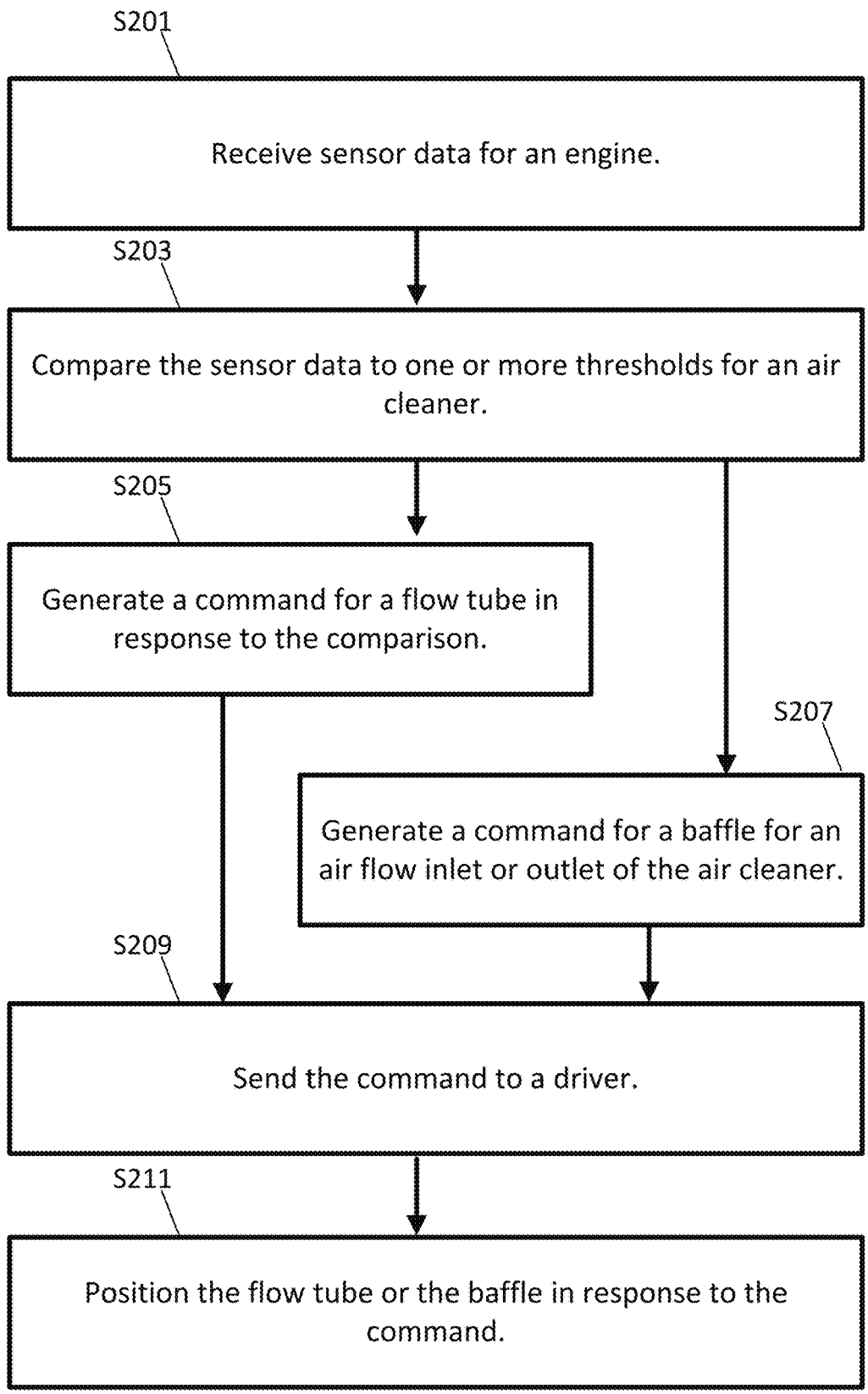
FIG. 15 illustrates an example flowchart for the operation of the controller of FIG. 14.

FIG. 14 illustrates an example controller 200 for controlling at least one of the examples of FIG. 9-13. The controller 200 includes a processor 202, a memory 201, and a communication interface 203. The communication interface 203 may communicate with a parallel input signal 210, a sensor input signal 212, an output 214, an input device 204, a driver 250, and a sensor array including one or more sensors such as a flow sensor 212, a load sensor 218, and an engine speed sensor 220. Additional, different, or fewer components may be included. FIG. 15 illustrates an example flowchart for the operation of the controller 200 of FIG. 14. Additional, different, or fewer acts may be included.

At act S201, the processor 202 or the communication interface 203 receives sensor data for an engine. The sensor may be generated at the sensor array including one or a combination of the flow sensor 212, the load sensor 218, and an engine speed sensor 220. The flow sensor 212 may include a mass flow sensor or another device that detects the flow of air or the volume of air passing the sensor. The controller 200 may modify the output of the flow sensor 212 based on one or more sensors (e.g., temperature sensor, altitude sensor, or another sensor). The load sensor 218 may receive data indicative of the load on the engine based on the torque of a drive shaft of the engine. The engine speed sensor 220 receives data indicative of the speed of the engine based on the speed of the drive shaft of the engine, a combustion cycle of the engine, or the crankshaft of the engine. The communication interface 203 may be an example means for receiving sensor data for an engine.

At act S203, the processor 202 performs a comparison of the sensor data to one or more thresholds for an air cleaner. The thresholds may be stored in memory 101 associated with particular models of the air cleaner, particular types of the engine, or particular ambient conditions. The thresholds may be receipt from the input device 204 via a user input or selection. The processor 202 may access the memory 101 based on the type of air cleaner or shape of air cleaner, based on the device including the engine, or a set of environmental data such as temperature, humidity, altitude, or another factor. The processor 202 may include a module or may be apportioned to include an application specific controller or integrated circuit as a means for performing a comparison of the sensor data with one or more thresholds.

Acts S205 and S207 may be performed alternatively or in the same embodiment. At act S205, the processor 202 generates a command for a flow tube in response to the comparison. The command for the flow tube may include a vane position (e.g., highest vertical position, middle position, lowest vertical position), or a vane adjustment (e.g., move the vane one step into the flow tube, move the vane one step out of the flow tube, or another adjustment). The processor 202 may include a module or may be apportioned to include an application specific controller or integrated circuit as a means for generating a command for the flow tube in response to the comparison.

At act S207, the processor 202 generates a command for a baffle for an air flow inlet or outlet of the air cleaner in response to the comparison. The command for the baffle may identify an inlet or an outlet of the air cleaner for the command. The command for the baffle may include a general baffle position (e.g., open, close, half open), a baffle angle, or a modification of the baffle angle (e.g., open the baffle a predetermined number of degrees more or less). The processor 202 may include a module or may be apportioned to include an application specific controller or integrated circuit as a means for generating a command for the baffle in response to the comparison.

At act S209, the processor 202 send the command in an output message such in response to the comparison. The output message may be sent to the driver 250. In addition, the output message may be displayed on an output device 214, which may include a handheld or mobile device (e.g., laptop, cellular phone or tablet) or another computer. The output device 214 may include a control panel of the engine or associated generator, which may be a touchscreen or liquid crystal display. The output device 214 may include one or more lights or light emitting diode (LED). When multiple LEDs are used, each LED may correspond to different commands (e.g., one LED corresponds to an increased flow, one LED corresponds to a decreased flow, one LED corresponds to a fault message). Other patterns are possible for a sequence of lights for the type, degree, or frequency of the output messages.

At act S211, the driver 250 positions the flow tube or the baffle in response to the command. The driver 250 may be any of the drivers discussed herein (e.g., driver 210, driver 310, driver 410). The driver 250 is a means for positioning the flow tube and/or the baffle in response to the command.

The processor 202 may include a general processor, digital signal processor, an application specific integrated circuit (ASIC), field programmable gate array (FPGA), analog circuit, digital circuit, combinations thereof, or other now known or later developed processor. The processor 202 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The input device 204 may be one or more buttons, keypad, keyboard, mouse, pen, trackball, switch, touch pad or other device or component for inputting data to the controller 200. The input device 203 and the output device 214 may be combined as a touch screen, that may be capacitive or resistive.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A controller for an apparatus for removing debris from an intake of an engine, the controller comprising:
    an air cleaner of the engine, the air cleaner comprising a flow tube and a spiral vane, wherein the spiral vane is configured to induce cyclonic air flow;
    a communication interface configured to receive sensor data for the engine;
    a memory configured to store one or more thresholds for the air cleaner of the engine; and
    a processor configured to perform a comparison of the sensor data to the one or more thresholds for an air cleaner and generate a command for the air cleaner in response to the comparison;
    wherein the command for the air cleaner is configured to control the flow tube in response to the comparison, the command for the flow tube including a vane position command or a vane adjustment command.

2. The controller of claim 1, wherein the command for the air cleaner is configured to control a baffle for an air flow inlet or outlet of the air cleaner in response to the comparison.

3. The controller of claim 2, wherein the command for the baffle identifies an inlet or an outlet of the air cleaner.

4. The controller of claim 2, wherein the command for the baffle includes a baffle position, a baffle angle, or a modification of the baffle angle.

5. The controller of claim 1, wherein the one or more thresholds are associated with a model of the air cleaner, a type of the engine, or an ambient conditions.

6. The controller of claim 1, wherein the one or more thresholds are provided by an input device via a user input or selection.

7. The controller of claim 1, wherein the sensor data is received from a flow sensor based on a flow of air or the volume of air of the air cleaner.

8. The controller of claim 1, wherein the sensor data is received from a load sensor based on the torque of a drive shaft of the engine.

9. The controller of claim 1, wherein the sensor data is received from an engine speed sensor based on the speed of a drive shaft of the engine, a combustion cycle of the engine, or a crankshaft of the engine.

10. The controller of claim 1, wherein the command includes an output message in response to the comparison, and the output message is sent to a display associated with the engine.

11. The controller of claim 10, wherein the output message instructs a user to position a flow tube or a baffle for the air cleaner.

12. A method comprising:
    providing an air cleaner of an engine, the air cleaner comprising a flow tube and a spiral vane, wherein the spiral vane is configured to induce cyclonic air flow;
    storing one or more thresholds for the air cleaner of an engine;
    receiving sensor data for the engine;
    performing a comparison of the sensor data to the one or more thresholds for an air cleaner; and
    generating a command for the air cleaner in response to the comparison;
    wherein the command for the air cleaner is configured to control the flow tube in response to the comparison, the command for the flow tube including a vane position command or a vane adjustment command.

13. The method of claim 12, wherein the command for the air cleaner is configured to control a baffle for an air flow inlet or outlet of the air cleaner in response to the comparison.

14. The method of claim 13, wherein the command for the baffle identifies an inlet or an outlet of the air cleaner.

15. The method of claim 13, wherein the command for the baffle includes a baffle position, a baffle angle, or a modification of the baffle angle.

16. An apparatus comprising:
    an air intake manifold;
    an air cleaner housing coupled to the air intake manifold, the air cleaner housing comprising an air cleaner, the air cleaner comprising a flow tube and a spiral vane, wherein the spiral vane is configured to induce cyclonic air flow; and
    a controller for removing debris from the air intake manifold, the controller comprising:
        a communication interface configured to receive sensor data;
        a memory configured to store one or more thresholds for the air cleaner; and
        a processor configured to perform a comparison of the sensor data to the one or more thresholds for the air cleaner and generate a command for the air cleaner in response to the comparison;
    wherein the command for the air cleaner is configured to control the flow tube in response to the comparison, the command for the flow tube including a vane position command or a vane adjustment command.

* * * * *